(12) United States Patent
Honeywood

(10) Patent No.: US 7,120,573 B2
(45) Date of Patent: Oct. 10, 2006

(54) MESSAGE PROCESSING FOR HANDLING UNSUPPORTED CHARACTER CODES

(75) Inventor: Richard Mark Honeywood, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 990 days.

(21) Appl. No.: 09/794,916

(22) Filed: Feb. 28, 2001

(65) Prior Publication Data

US 2002/0059448 A1    May 16, 2002

(30) Foreign Application Priority Data

Nov. 13, 2000 (JP) ............................ 2000-345655
Jan. 31, 2001 (JP) ............................ 2001-024625

(51) Int. Cl.
G06F 17/20 (2006.01)

(52) U.S. Cl. ................... 704/8; 704/9; 707/3; 707/4

(58) Field of Classification Search ............. 704/8–10, 704/7, 1; 348/465; 341/51; 345/168; 707/2–4
See application file for complete search history.

(56) References Cited

U.S. PATENT DOCUMENTS

| | | | | |
|---|---|---|---|---|
| 5,889,481 A | * | 3/1999 | Okada | 341/51 |
| 5,963,265 A | * | 10/1999 | Bae et al. | 348/465 |
| 6,138,086 A | * | 10/2000 | Rose et al. | 704/8 |
| 6,326,953 B1 | * | 12/2001 | Wana | 345/168 |
| 6,415,250 B1 | * | 7/2002 | van den Akker | 704/9 |
| 6,496,793 B1 | * | 12/2002 | Veditz et al. | 704/8 |
| 2002/0010742 A1 | | 1/2002 | Kihara et al. | |

FOREIGN PATENT DOCUMENTS

| | | |
|---|---|---|
| JP | 7-141337 | 6/1995 |
| JP | 9-101925 | 4/1997 |
| JP | 9-204431 | 8/1997 |
| JP | 10275121 | 10/1998 |
| JP | 11175529 | 7/1999 |
| JP | 11187188 | 7/1999 |
| JP | 11353310 | 12/1999 |
| JP | 2000-13863 | 1/2000 |
| JP | 2000-132480 | 5/2000 |
| JP | 00/41080 | 7/2000 |
| JP | 2002-73514 | 3/2002 |

OTHER PUBLICATIONS

English Language Abstract of JP 2000-132480.
English Language Abstract of JP 11-187188.
English Language Abstract of JP 10-275121.

(Continued)

*Primary Examiner*—Richemond Dorvil
*Assistant Examiner*—Huyen X. Vo
(74) *Attorney, Agent, or Firm*—Greenblum & Bernstein, P.L.C.

(57) ABSTRACT

A nonsense illegal character of a received message is completely avoided, and when the received message can not be correctly displayed, a notice that a language of the message is not supported is given to a user. Use language identification information is imparted to a header portion of a transmission frame of a message. Then, it is judged from the use language identification information whether a character code system corresponding to a language of a received character code string is a character code system supported by a computer. A message corresponding to the received character code string is generated in accordance with the character code system when the character code system is supported. On the other hand, when the character code system is not supported notice information indicating that a message can not be generated is displayed.

16 Claims, 22 Drawing Sheets

OTHER PUBLICATIONS

English Language Abstract of JP 2002-73514.
English Language Abstract of JP 2000-13863.
English Language Abstract of JP 11-175529.
English Language Abstract of JP 9-204431.
English Language Abstract of JP 9-101925.
English Language Abstract of JP 7-141337.
An English Language abstract of JP 11-353310.

* cited by examiner

DATA STRUCTURAL VIEW

FIG. 4A

| DATA OF VIDEO GAME APPARATUS (COMPUTER) 10A ||
|---|---|
| USE LANGUAGE | JAPANESE |
| SUPPORT CODE SYSTEM | shift-JIS |
| USE LANGUAGE IDENTIFIER - CHARACTER CODE SYSTEM CORRESPONDING TABLE ||
| shift-JIS CODE TABLE ||
| JAPANESE FONT ||

FIG. 4B

| DATA OF VIDEO GAME APPARATUS (COMPUTER) 10B ||
|---|---|
| USE LANGUAGE | ENGLISH |
| SUPPORT CODE SYSTEM | ASCII |
| USER LANGUAGE IDENTIFIER - CHARACTER CODE SYSTEM CORRESPONDING TABLE ||
| ASCII CODE TABLE ||
| ENGLISH FONT ||

FIG. 4C

| DATA OF VIDEO GAME APPARATUS (COMPUTER) 10C ||
|---|---|
| USE LANGUAGE | GERMAN (WEST EUROPEAN LANGUAGES) |
| SUPPORT CODE SYSTEM | ISO8859-1 (Latin-1) |
| USER LANGUAGE IDENTIFIER - CHARACTER CODE SYSTEM CORRESPONDING TABLE ||
| ISO8859-1 CODE TABLE ||
| WEST EUROPEAN LANGUAGE FONT ||

USE LANGUAGE IDENTIFIER - CHARACTER CODE SYSTEM CORRESPONDING TABLE

| USE LANGUAGE IDENTIFIER < LANG > | CHARACTER CODE SYSTEM | SUPPORT LANGUAGE |
|---|---|---|
| JAP | shift-JIS | JAPANESE (ENGLISH, JAPANESE) |
| ENG | ASCII | ENGLISH |
| Latin-1 | ISO8859-1 | WEST EUROPEAN LANGUAGES (ENGLISH, GERMAN, ···) |
| CHA | GB 2312-80 | CHINESE (ENGLISH, CHINESE) |
| KOR | KS X 1002:1991 | KOREAN (ENGLISH, KOREAN) |
| ⋮ | ⋮ | ⋮ |

EXAMPLE OF A CASE WHERE SUPPORT MESSAGE IS EXPRESSED BY " ======"

SCREEN TRANSITION OF VIDEO GAME APPARATUS 10A

SCREEN TRANSITION OF VIDEO GAME APPARATUS 10B

SCREEN TRANSITION OF VIDEO GAME APPARATUS 10C

EXAMPLE OF A CASE WHERE SUPPORT MESSAGE IS EXPRESSED BY "======"

SCREEN TRANSITION OF VIDEO GAME APPARATUS 10A

SCREEN TRANSITION OF VIDEO GAME APPARATUS 10B

SCREEN TRANSITION OF VIDEO GAME APPARATUS 10C

GAME SCREEN

MESSAGE SCREEN

EXAMPLE OF A CASE WHERE SUPPORT MESSAGE IS EXPRESSED BY " = = = = = ="

SCREEN TRANSITION OF
VIDEO GAME APPARATUS 10A

USER B>Hi!
>KONNICHIHA!

SCREEN TRANSITION OF
VIDEO GAME APPARATUS 10B

>Hi!

SCREEN TRANSITION OF
VIDEO GAME APPARATUS 10C

USER B>Hi!

GAME SCREEN

MESSAGE SCREEN

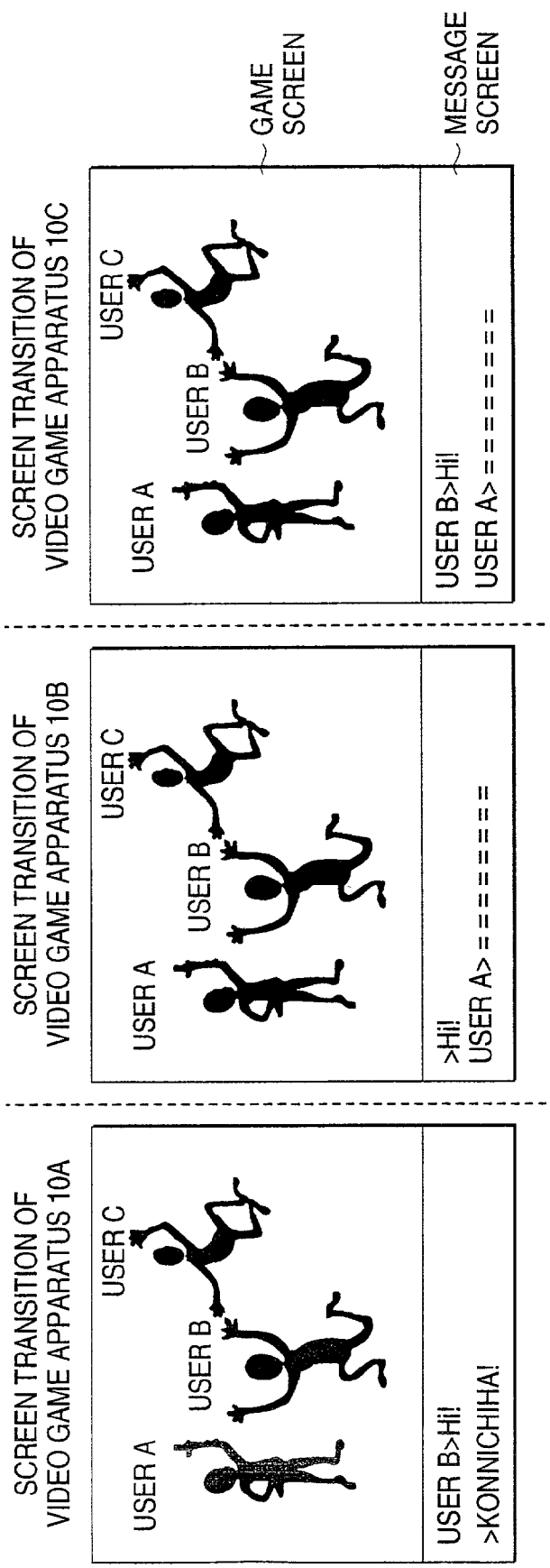

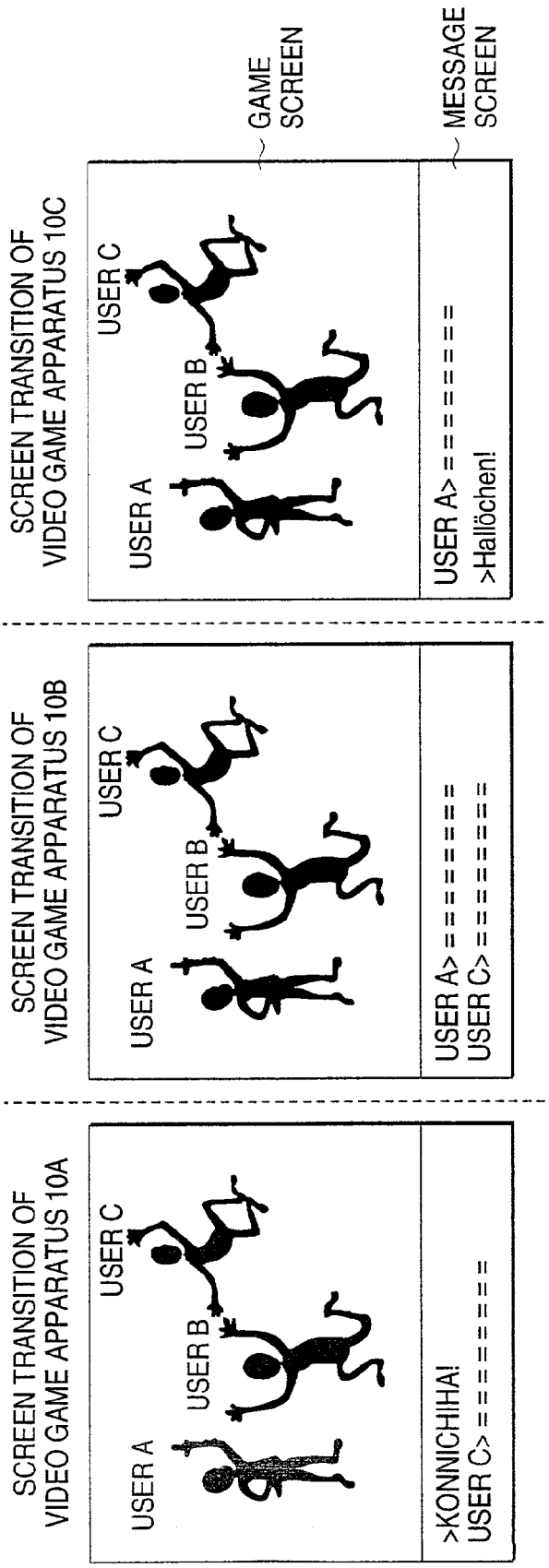

DATA STRUCTURAL VIEW

FIG. 17A

| DATA OF VIDEO GAME APPARATUS (COMPUTER) 10A ||
|---|---|
| USE LANGUAGE | JAPANESE |
| SUPPORT CODE SYSTEM | shift-JIS |
| NONSUPPORT LANGUAGE NOTICE SENTENCE | <<< NAZO NO KOTOBA GA KIKOERU >>> |
| USE LANGUAGE IDENTIFIER - CHARACTER CODE SYSTEM CORRESPONDING TABLE ||
| shift-JIS CODE TABLE ||
| JAPANESE FONT ||

FIG. 17B

| DATA OF VIDEO GAME APPARATUS (COMPUTER) 10B ||
|---|---|
| USE LANGUAGE | ENGLISH |
| SUPPORT CODE SYSTEM | ASCII |
| NONSUPPORT LANGUAGE NOTICE SENTENCE | <<< AN UNKNOWN LANGUAGE IS HEARD >>> |
| USE LANGUAGE IDENTIFIER - CHARACTER CODE SYSTEM CORRESPONDING TABLE ||
| ASCII CODE TABLE ||
| ENGLISH FONT ||

FIG. 17C

| DATA OF VIDEO GAME APPARATUS (COMPUTER) 10C ||
|---|---|
| USE LANGUAGE | GERMAN (WEST EUROPEAN LANGUAGES) |
| SUPPORT CODE SYSTEM | ISO8859-1 (Latin-1) |
| NONSUPPORT LANGUAGE NOTICE SENTENCE | <<< EINE UNBEKANNTE SPRACHE IST ZU HÖREN >>> |
| USE LANGUAGE IDENTIFIER - CHARACTER CODE SYSTEM CORRESPONDING TABLE ||
| ISO8859-1 CODE TABLE ||
| WEST EUROPEAN LANGUAGE FONT ||

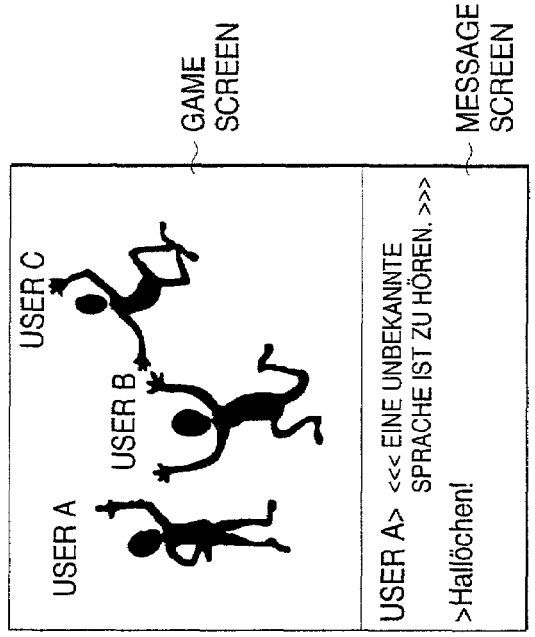
FIG. 18A / FIG. 18B / FIG. 18C — NOTIFICATION BY CHARACTER
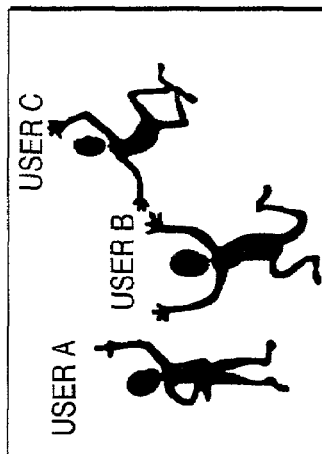
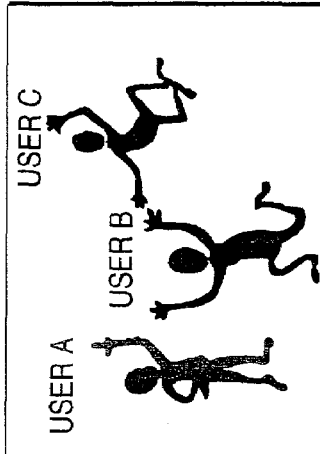

DATA STRUCTURAL VIEW

FIG. 19A

| DATA OF VIDEO GAME APPARATUS (COMPUTER) 10A ||
|---|---|
| USE LANGUAGE | JAPANESE |
| SUPPORT CODE SYSTEM | shift-JIS |
| DATA FOR DISPLAY OF LANGUAGE IDENTIFICATION ICON (NATIONAL FLAG, ETC.) ||
| USE LANGUAGE IDENTIFIER - CHARACTER CODE SYSTEM CORRESPONDING TABLE ||
| shift-JIS CODE TABLE ||
| JAPANESE FONT ||

FIG. 19B

| DATA OF VIDEO GAME APPARATUS (COMPUTER) 10B ||
|---|---|
| USE LANGUAGE | ENGLISH |
| SUPPORT CODE SYSTEM | ASCII |
| DATA FOR DISPLAY OF LANGUAGE IDENTIFICATION ICON (NATIONAL FLAG, ETC.) ||
| USE LANGUAGE IDENTIFIER - CHARACTER CODE SYSTEM CORRESPONDING TABLE ||
| ASCII CODE TABLE ||
| ENGLISH FONT ||

FIG. 19C

| DATA OF VIDEO GAME APPARATUS (COMPUTER) 10C ||
|---|---|
| USE LANGUAGE | GERMAN (WEST EUROPEAN LANGUAGES) |
| SUPPORT CODE SYSTEM | ISO8859-1 (Latin-1) |
| DATA FOR DISPLAY OF LANGUAGE IDENTIFICATION ICON (NATIONAL FLAG, ETC.) ||
| USE LANGUAGE IDENTIFIER - CHARACTER CODE SYSTEM CORRESPONDING TABLE ||
| ISO8859-1 CODE TABLE ||
| WEST EUROPEAN LANGUAGE FONT ||

FIG. 20

DATA FOR DISPLAY OF LANGUAGE IDENTIFICATION ICON

| LANGUAGE | ICON |
|---|---|
| JAPANESE |  |
| ENGLISH |  |
| GERMAN |  |
| ⋮ | ⋮ |

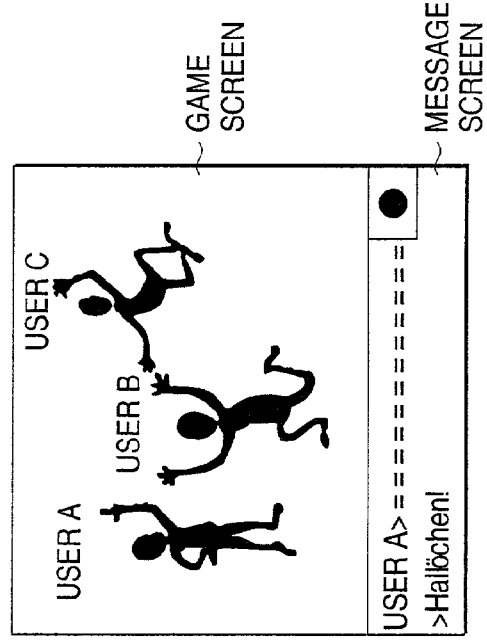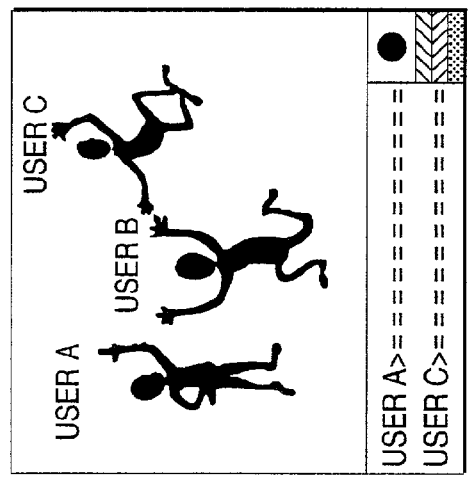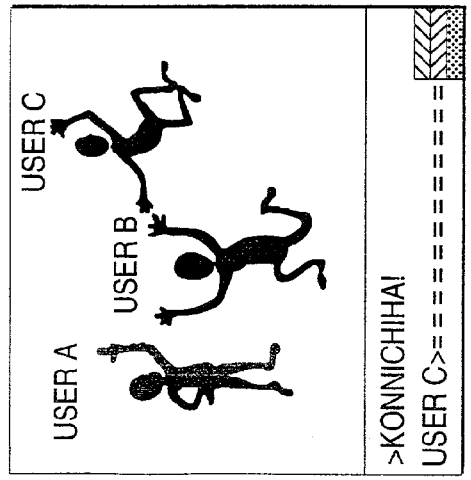

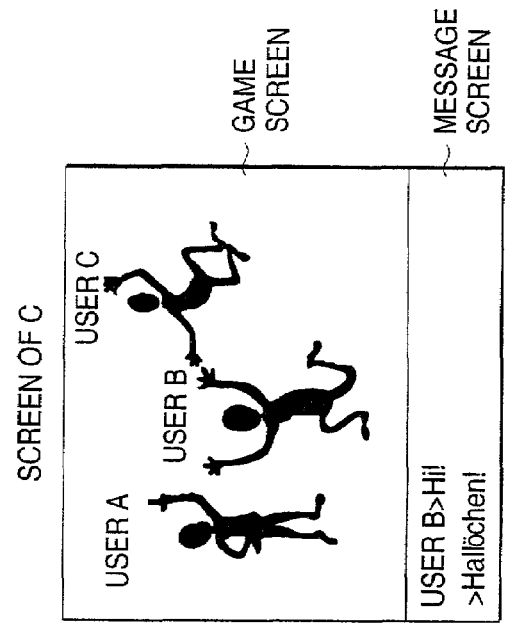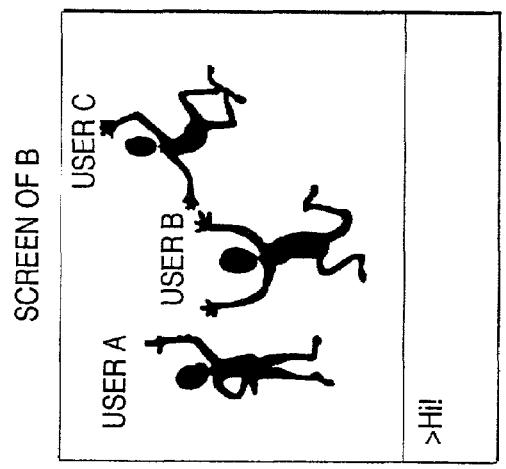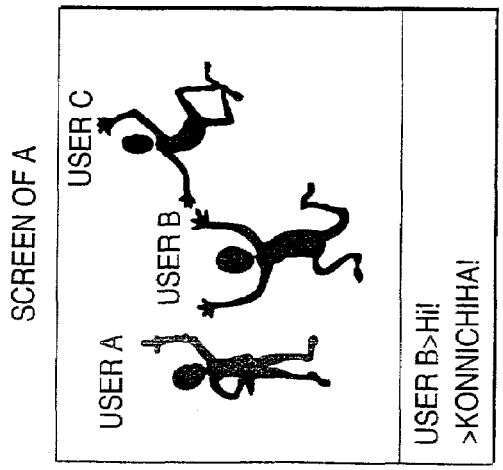

MESSAGE PROCESSING FOR HANDLING UNSUPPORTED CHARACTER CODES

CROSS REFERENCE TO RELATED APPLICATION

The present disclosure relates to subject matter contained in Japanese Patent Application Nos. 2000-345655, filed on Nov. 13, 2000, and 2001-024625, filed on Jan. 31, 2001, the disclosures of both of which are expressly incorporated herein by reference in their entireties.

BACKGROUND OF THE INVENTION

1. Field of the Invention

The present invention relates to communications. More particularly the present invention relates to transmitting and receiving messages, through a global communication network such as the Internet.

2. Description of the Related Art

In communication through a global network such as the Internet, there is a case where persons having different mother languages exchange messages. As a method of exchanging messages, there are electronic mail, chat, net news (NetNews) and the like.

In many information processing terminals such as computers, characters can be input with a language of one character code system set by the user, and only other restricted languages (support language) can be displayed. In communication through the global network, when a message is transmitted to another computer or the like, the receiving computer does not necessarily support the language of the message.

Japanese Patent Unexamined Publication No. Hei. 11-353310 discloses a technique in which when a document file is transmitted, the environment of an apparatus at a transmission destination is judged from an address of a transmission destination, a character code of the transmitted document file is converted into a character code which can be handled by the apparatus at the transmission destination, and it is transmitted.

Although the foregoing technique of converting the character code of the document file is effective for one-to-one communication, such as the electronic mail, or communication in which a transmission destination is specified, it is difficult to convert the character code of the message in accordance with the receiving party environment. It is also difficult to transmit in an environment, such as in the chat, net news, or message exchange in a network game, in which it is expected that the general public reads the message, and the party reading the message can not be specified when transmitting the message, and a difference in support languages is wide.

In the present environment of message exchange in the network game or the like, in a message in accordance with a language (nonsupported language) which is not supported by the computer of the receiver side, there occurs a phenomenon, so-called illegal character, in which characters of the transmitted message are changed into other characters in accordance with the character code system used at the reception side and are displayed. A display of the garbled reception message has no meaning and is not significant.

In addition, since the illegal character of the message is also produced by operation failure of a computer itself, omission of part of data due to a communication error, or the like, if the illegal character is produced in the received message, the user can not easily understand its cause, and the user feels a sense of uneasiness and does not know how to deal with it.

Some conventional computers or the like estimate a support language from a character code string of a received message and display the message in accordance with a character code system according to a language of the received message. However, since the support language is estimated based upon the character code string of the received message, certainty is lacking, and it is impossible to completely avoid a garbled message.

SUMMARY OF THE INVENTION

The present invention has been made to solve the above problems. An object of the invention is to provide a computer-readable recording medium including a program for message transmission and reception, a message transmission program, a message reception program, a message transmission-reception program, a message transmission method, a message reception method, a message transmission-reception method, and an information processing apparatus, in which a nonsense illegal character display of a received message is completely avoided. When the received message can not be correctly displayed, a sense of uneasiness of a user can be alleviated by intelligibly informing the user that a language of the message is not supported.

In order to achieve the foregoing object, a computer-readable recording medium of the invention is a computer-readable recording medium recorded with a program for transmitting a message through a network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, and to transmit the transmission frame.

In addition, a computer-readable recording medium of the present invention is a computer-readable recording medium recorded with a program for receiving a character code string corresponding to a message through a network. The program causes a computer to judge a language of a character code string in a transmission frame from use language identification information imparted to the transmission frame when the transmission frame in which the use language information is imparted is received. The program also causes the computer to judge whether a character code system corresponding to the language of the received character code string is a character code system supported by the computer. The program causes a computer to generate a message corresponding to the received character code string in accordance with the character code system when the character code system corresponding to the language of the received character code string is supported, and to display the generated message.

Moreover, a computer-readable recording medium of the invention is a computer-readable recording medium recorded with a program for receiving a character code string corresponding to a message through a network. The program causes a computer to judge a language of a character code string in a transmission frame from use language identification information imparted to the transmission frame when the transmission frame in which the use language information is imparted is received. The program also causes the computer to judge whether a character code system corresponding to the language of the received character code string is a character code system supported by the computer. The program also causes the computer to generate a message corresponding to the received character code string in accordance with the character code system when the character code system corresponding to the language of the received character code string is supported, to display the generated message, and to display notice information indicating that a message can not be generated when the character code system corresponding to the language of the received character code string is not supported.

As the notice information indicating that the message can not be generated, there is a predetermined symbol such as [=], a notice message indicating reception of a character code string in which a message cannot be generated, an icon made to correspond to a language, and the like. As the icon, there is a national flag of a country in which the corresponding language is a mother language, or the like.

Moreover, a computer-readable recording medium of the invention is a computer-readable recording medium recorded with a program for receiving a character code string corresponding to a message through a network. The program causes a computer to judge a language of a character code string in a transmission frame from use language identification information imparted to the transmission frame when the transmission frame in which the use language information is imparted is received. The program also causes the computer to judge whether a character code system corresponding to the language of the received character code string is a character code system supported by the computer, and to generate a message corresponding to the received character code string in accordance with the character code system when the character code system corresponding to the language of the received character code string is supported. The program also causes the computer to display the generated message, and to stop a message display when the character code system corresponding to the language of the received character code string is not supported.

In addition, a computer-readable recording medium of the invention is a computer-readable recording medium recorded with a program for transmitting a message through a network and receiving a character code string corresponding to a message through the network. The program causes a computer to generate a character code string corresponding to an input message in accordance with a character code system of a language set used in the computer when the message composed of characters is input, and to impart use language identification information indicating a type of use language of the character code string to a transmission frame of the character code string. The program also causes the computer to transmit the transmission frame, and to judge a language of a character code string in a transmission frame from use language identification information imparted to a transmission frame when the transmission frame in which the use language information is imparted is received, and to judge whether a character code system corresponding to the language of the received character code string is a character code system supported by the computer. The program also causes the computer to generate a message corresponding to the received character code string in accordance with the character code system when the character code system corresponding to the language of the received character code string is supported, and to display the generated message.

Moreover, a computer-readable recording medium of the invention is a computer-readable recording medium recorded with a program for transmitting a message through a network and receiving a character code string corresponding to a message through the network. The program causes a computer to generate a character code string corresponding to an input message in accordance with a character code system of a language set used in the computer when the message composed of characters is input, and to impart use language identification information indicating a type of use language of the character code string to a transmission frame of the character code string. The program also causes the computer to transmit the transmission frame, and to judge a language of a character code string in a transmission frame from use language identification information imparted to a transmission frame when the transmission frame in which the use language information is imparted is received, and to judge whether a character code system corresponding to the language of the received character code string is a character code system supported by the computer. The program also causes the computer to generate a message corresponding to the received character code string in accordance with the character code system when the character code system corresponding to the language of the received character code string is supported, to display the generated message, and to display notice information indicating that a message cannot be generated when the character code system corresponding to the language of the received character code string is not supported.

In addition, a computer-readable recording medium of the invention is a computer-readable recording medium recorded with a program for transmitting a message through a network and receiving a character code string corresponding to the message through the network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, to transmit the transmission frame, and to judge a language of a character code string in a transmission frame from use language identification information imparted to a transmission frame when the transmission frame in which the use language information is imparted is received. The program also causes the computer to judge whether a character code system corresponding to the language of the received character code string is a character code system supported by the computer, and to generate a message corresponding to the received character code string in accordance with the character code system when the character code system corresponding to the language of the received character code string is supported. The program also causes the computer to display the generated message, and to stop a message display when the character code system corresponding to the language of the received character code string is not supported.

Moreover, a message transmission program of the invention is a program for transmitting a message through a network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, and to transmit the transmission frame.

In addition, a message reception program of the invention is a program for receiving a character code string corresponding to a message through a network. The program causes a computer to judge a language of a character code string in a transmission frame from use language identification information imparted to a transmission frame when the transmission frame in which the use language information is imparted is received. The program also causes the computer to judge whether a character code system corresponding to the language of the received character code string is a character code system supported by the computer, to generate a message corresponding to the received character code string in accordance with the character code system when the character code system corresponding to the language of the received character code string is supported, and to display the generated message.

Moreover, a message reception program of the invention is a program for receiving a character code string corresponding to a message through a network. The program causes a computer to judge a language of a character code string in a transmission frame from use language identification information imparted to the transmission frame when the transmission frame in which the use language information is imparted is received. The program also causes the computer to judge whether a character code system corresponding to the language of the received character code string is a character code system supported by the computer, and to generate a message corresponding to the received character code string in accordance with the character code system when the character code system corresponding to the language of the received character code string is supported. The program also causes the computer to display the generated message, and to display notice information indicating that a message cannot be generated when the character code system corresponding to the language of the received character code string is not supported.

In addition, a message reception program of the invention is a program for receiving a character code string corresponding to a message through a network. The program causes a computer to judge a language of a character code string in a transmission frame from use language identification information imparted to the transmission frame when the transmission frame in which the use language information is imparted is received. The program also causes the computer to judge whether a character code system corresponding to the language of the received character code string is a character code system supported by the computer, and to generate a message corresponding to the received character code string in accordance with the character code system when the character code system corresponding to the language of the received character code string is supported. The program also causes the computer to display the generated message, and to stop a message display when the character code system corresponding to the language of the received character code string is not supported.

Moreover, a message transmission-reception program of the invention is a program for transmitting a message through a network and receiving a character code string corresponding to a message through the network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, to transmit the transmission frame, and to judge a language of a character code string in the transmission frame from use language identification information imparted to a transmission frame when the transmission frame in which the use language information is imparted is received. The program also causes the computer to judge whether a character code system corresponding to the language of the received character code string is a character code system supported by the computer, to generate a message corresponding to the received character code string in accordance with the character code system when the character code system corresponding to the language of the received character code string is supported, and to display the generated message.

In addition, a message transmission-reception program of the invention is a program for transmitting a message through a network and receiving a character code string corresponding to a message through the network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, to transmit the transmission frame, and to judge a language of a character code string in the transmission frame from use language identification information imparted to the transmission frame when the transmission frame in which the use language information is imparted is received. The program also causes the computer to judge whether a character code system corresponding to the language of the received character code string is a character code system supported by the computer, and to generate a message corresponding to the received character code string in accordance with the character code system when the character code system corresponding to the language of the received character code string is supported, to display the generated message, and to display notice information indicating that a message can not be generated when the character code system corresponding to the language of the received character code string is not supported.

Moreover, a message transmission-reception program of the invention is a program for transmitting a message through a network and receiving a character code string corresponding to a message through the network. The program causes a computer to generate a character code string corresponding to an input message in accordance with a character code system of a language set used in the computer when the message composed of characters is input. The program also causes the computer to impart use language identification information indicating a type of use language of the character code string to a transmission frame of the character code string, and to transmit the transmission frame. The program also causes the computer to judge a language of a character code string in the transmission frame from use language identification information imparted to the transmission frame when the transmission frame in which the use language information is imparted is received, and to judge whether a character code system corresponding to the language of the received character code string is a character code system supported by the computer. The program also causes the computer to generate a message corresponding to the received character code string in accordance with the character code system when the character code system corresponding to the language of the received character code string is supported, to display the generated message, and to stop a message display when the character code system corresponding to the language of the received character code string is not supported.

According to another aspect of the present invention, a message transmission method of the invention is a message transmission method for transmitting a message through a network from a computer. The method includes generating a character code string corresponding to an input message in accordance with a character code system of a language set used in the computer when the message composed of characters is input. The method also includes imparting use language identification information indicating a type of use language of the character code string to a transmission frame of the character code string, and transmitting the transmission frame.

Moreover, a message reception method of the invention is a message reception method for receiving a character code string corresponding to a message through a network to a computer. The method includes judging a language of a character code string in a transmission frame from use language identification information imparted to a transmission frame when the transmission frame in which the use language information is imparted is received. The method also includes judging whether a character code system corresponding to the language of the received character code string is a character code system supported by the computer, and generating a message corresponding to the received character code string in accordance with the character code system when the character code system corresponding to the language of the received character code string is supported, and displaying the generated message.

In addition, a message reception method of the invention is a message reception method for receiving a character code string corresponding to a message through a network to a computer. The method includes judging a language of a character code string in a transmission frame from use language identification information imparted to a transmission frame when the transmission frame in which the use language information is imparted is received. The method also includes judging whether a character code system corresponding to the language of the received character code string is a character code system supported by the computer, and generating a message corresponding to the received character code string in accordance with the character code system when the character code system corresponding to the language of the received character code string is supported. The method also includes displaying the generated message, and displaying notice information indicating that a message can not be generated when the character code system corresponding to the language of the received character code string is not supported.

Moreover, a message reception method of the invention is a message reception method for receiving a character code string corresponding to a message through a network to a computer. The method includes judging a language of a character code string in a transmission frame from use language identification information imparted to the transmission frame when the transmission frame in which the use language information is imparted is received. The method also includes judging whether a character code system corresponding to the language of the received character code string is a character code system supported by the computer, and generating a message corresponding to the received character code string in accordance with the character code system when the character code system corresponding to the language of the received character code string is supported. The method also includes displaying the generated message, and stopping a message display when the character code system corresponding to the language of the received character code string is not supported.

In addition, a message transmission-reception method of the invention is a message transmission-reception method for transmitting a message through a network from a computer and receiving a character code string corresponding to a message through the network into the computer. The method includes generating a character code string corresponding to an input message in accordance with a character code system of a language set used in the computer when the message composed of characters is input. The method also includes imparting use language identification information indicating a type of use language of the character code string to a transmission frame of the character code string, and transmitting the transmission frame. The method also includes judging a language of a character code string in a transmission frame from use language identification information imparted to a transmission frame when the transmission frame in which the use language information is imparted is received, and judging whether a character code system corresponding to the language of the received character code string is a character code system supported by the computer. The method also includes generating a message corresponding to the received character code string in accordance with the character code system when the character code system corresponding to the language of the received character code string is supported, and displaying the generated message.

Moreover, a message transmission-reception method of the invention is a message transmission-reception method for transmitting a message through a network from a computer and receiving a character code string corresponding to a message through the network into the computer. The method includes generating a character code string corresponding to an input message in accordance with a character code system of a language set used in the computer when the message composed of characters is input. The method also includes imparting use language identification information indicating a type of use language of the character code string to a transmission frame of the character code string, and transmitting the transmission frame. The method also includes judging a language of a character code string in a transmission frame from use language identification information imparted to the transmission frame when the transmission frame in which the use language information is imparted is received. The method also includes judging whether a character code system corresponding to the language of the received character code string is a character code system supported by the computer, and generating a message corresponding to the received character code string in accordance with the character code system when the character code system corresponding to the language of the received character code string is supported. The method also includes displaying the generated message, and displaying notice information indicating that a message can not be generated when the character code system corresponding to the language of the received character code string is not supported.

In addition, a message transmission-reception method of the invention is a message transmission-reception method for transmitting a message through a network from a computer and receiving a character code string corresponding to a message through the network into the computer. The method includes generating a character code string corresponding to an input message in accordance with a character code system of a language set used in the computer when the message composed of characters is input, and imparting use language identification information indicating a type of use language of the character code string to a transmission frame of the character code string. The method also includes transmitting the transmission frame, judging a language of a character code string in a transmission frame from use language identification information imparted to a transmission frame when the transmission frame in which the use language information is imparted is received, and judging whether a character code system corresponding to the language of the received character code string is a character code system supported by the computer. The method also includes generating a message corresponding to the received character code string in accordance with the character code system when the character code system corresponding to the language of the received character code string is supported, displaying the generated message, and stopping a message display when the character code system corresponding to the language of the received character code string is not supported.

According to another aspect of the present invention, an information processing apparatus of the invention is an information processing apparatus for transmitting a message through a network. The apparatus generates a character code string corresponding to an input message in accordance with a character code system of a language set used in the information processing apparatus when the message composed of characters is input. The apparatus also imparts use language identification information indicating a type of use language of the character code string to a transmission frame of the character code string, and transmits the transmission frame.

In addition, an information processing apparatus of the invention is an information processing apparatus for receiving a character code string corresponding to a message through a network. The apparatus judges a language of a character code string in a transmission frame from use language identification information imparted to the transmission frame when the transmission frame in which the use language information is imparted is received. The apparatus also judges whether a character code system corresponding to the language of the received character code string is a character code system supported by the information processing apparatus, generates a message corresponding to the received character code string in accordance with the character code system when the character code system corresponding to the language of the received character code string is supported, and displays the generated message.

Moreover, an information processing apparatus of the invention is an information processing apparatus for receiving a character code string corresponding to a message through a network. The apparatus judges a language of a character code string in a transmission frame from use language identification information imparted to a transmission frame when the transmission frame in which the use language information is imparted is received. The apparatus also judges whether a character code system corresponding to the language of the received character code string is a character code system supported by the information processing apparatus, and generates a message corresponding to the received character code string in accordance with the character code system when the character code system corresponding to the language of the received character code string is supported. The apparatus also displays the generated message, and displays notice information indicating that a message can not be generated when the character code system corresponding to the language of the received character code string is not supported.

In addition, an information processing apparatus of the invention is an information processing apparatus for receiving a character code string corresponding to a message through a network. The apparatus judges a language of a character code string in a transmission frame from use language identification information imparted to a transmission frame when the transmission frame in which the use language information is imparted is received. The apparatus also judges whether a character code system corresponding to the language of the received character code string is a character code system supported by the information processing apparatus, and generates a message corresponding to the received character code string in accordance with the character code system when the character code system corresponding to the language of the received character code string is supported. The apparatus also displays the generated message, and stops a message display when the character code system corresponding to the language of the received character code string is not supported.

Moreover, an information processing apparatus of the invention is an information processing apparatus for transmitting a message through a network and receiving a character code string corresponding to the message through the network. The apparatus generates a character code string corresponding to an input message in accordance with a character code system of a language set used in the information processing apparatus when the message composed of characters is input. The apparatus also imparts use language identification information indicating a type of use language of the character code string to a transmission frame of the character code string, and transmits the transmission frame. The apparatus also judges a language of a character code string in the transmission frame from use language identification information imparted to the transmission frame when the transmission frame in which the use language information is imparted is received, and judges whether a character code system corresponding to the language of the received character code string is a character code system supported by the information processing apparatus. The apparatus also generates a message corresponding to the received character code string in accordance with the character code system when the character code system corresponding to the language of the received character code string is supported, and displays the generated message.

In addition, an information processing apparatus of the invention is an information processing apparatus for transmitting a message through a network and receiving a character code string corresponding to the message through the network. The apparatus generates a character code string corresponding to an input message in accordance with a character code system of a language set used in the information processing apparatus when the message composed of characters is input. The apparatus also imparts use language identification information indicating a type of use language of the character code string to a transmission frame of the character code string, and transmits the transmission frame. The apparatus also judges a language of a character code, string in the transmission frame from use language identification information imparted to the transmission frame when the transmission frame in which the use language information is imparted is received. The apparatus also judges whether a character code system corresponding to the language of the received character code string is a character code system supported by the information processing apparatus, and generates a message corresponding to the received character code string in accordance with the character code system when the character code system corresponding to the language of the received character code string is supported. The apparatus also displays the generated message, and displays notice information indicating that a message can not be generated when the character code system corresponding to the language of the received character code string is not supported.

Finally, an information processing apparatus of the invention is an information processing apparatus for transmitting a message through a network and receiving a character code string corresponding to the message through the network. The apparatus generates the character code string corresponding to the input message in accordance with a character code system of a language set used in the information processing apparatus when the message composed of characters is input. The apparatus also imparts use language identification information indicating a type of use language of the character code string to a transmission frame of the character code string, and transmits the transmission frame. The apparatus also judges a language of a character code string in the transmission frame from use language identification information imparted to the transmission frame when the transmission frame in which the use language information is imparted is received. The apparatus also judges whether a character code system corresponding to the language of the received character code string is a character code system supported by the information processing apparatus, and generates a message corresponding to the received character code string in accordance with the character code system when the character code system corresponding to the language of the received character code string is supported. The apparatus also displays the generated message, and stops a message display when the character code system corresponding to the language of the received character code string is not supported.

The information processing apparatus includes various information processing terminals such as computers, mobile equipment such as a portable telephone, a video game apparatus having a built-in computer, and the like.

BRIEF DESCRIPTION OF THE DRAWINGS

FIGS. 4A, 4B and 4C are explanatory views each showing a data structure defined in a video game apparatus according to an aspect of the invention.

FIGS. 14A, 14B and 14C are explanatory views showing examples of the screen transitions of the client machines (video game apparatuses) at the time of message exchange according to an aspect of the invention.

FIGS. 16A, 16B and 16C are explanatory views showing examples of the screen transitions of the client machines (video game apparatuses) at the time of message exchange according to an aspect of the invention.

FIGS. 17A, 17B and 17C are explanatory views each showing another example of a data structure defined in a video game apparatus according to an aspect of the invention.

FIGS. 18A, 18B and 18C are explanatory views showing an example of a screen of each client machine (video game apparatus) at the time of message exchange according to an aspect of the invention.

FIGS. 19A 19B and 19C are explanatory views each showing another example of a data structure defined in a video game apparatus according to an aspect of the invention.

FIG. 20 is an explanatory view showing data for a display of a language identification icon.

FIGS. 21A, 21B, 21C, are explanatory views showing an example of a screen of each client machine (video game apparatus) at the time of message exchange according to an aspect of the invention.

FIGS. 22A, 22B and 22C are explanatory views showing another example of a screen of each client machine (video game apparatus) at the time of message exchange according to an aspect of the invention.

DETAILED DESCRIPTION OF THE PREFERRED EMBODIMENTS

Embodiments of the present invention will be described below in detail with reference to the accompanying drawings.

First, an outline of the present invention will be described with reference to FIG. 1.

As users, there is a user A located in Japan, a user B located in the USA or England, and a user C located in Germany. These users are in a state where two-way communication can be made through connection to the Internet or the like, in other words, in a state where message transmission and reception can be made.

In this example, a character code system of a use language of the user A is shift-JIS. Its support language is Japanese, a character code system of the user B is ASCII. Its support language is English. A character code system of the user C is ISO8859-1. Its support language is West European languages (German).

For each of the users A, B and C, when a message composed of characters is input, a character code string corresponding to the input message is generated in accordance with the character code system of the set use language, use language identification information indicating a type of use language of the character code string is imparted to a transmission frame of the character code string, and the transmission frame is transmitted. By this, the use language identification information indicating shift-JIS is imparted to the transmission frame transmitted by the user A. The use language identification information indicating ASCII is imparted to the transmission frame transmitted by the user B. The use language identification information indicating ISO8859-1 is imparted to the transmission frame transmitted by the user C.

Figure 1:
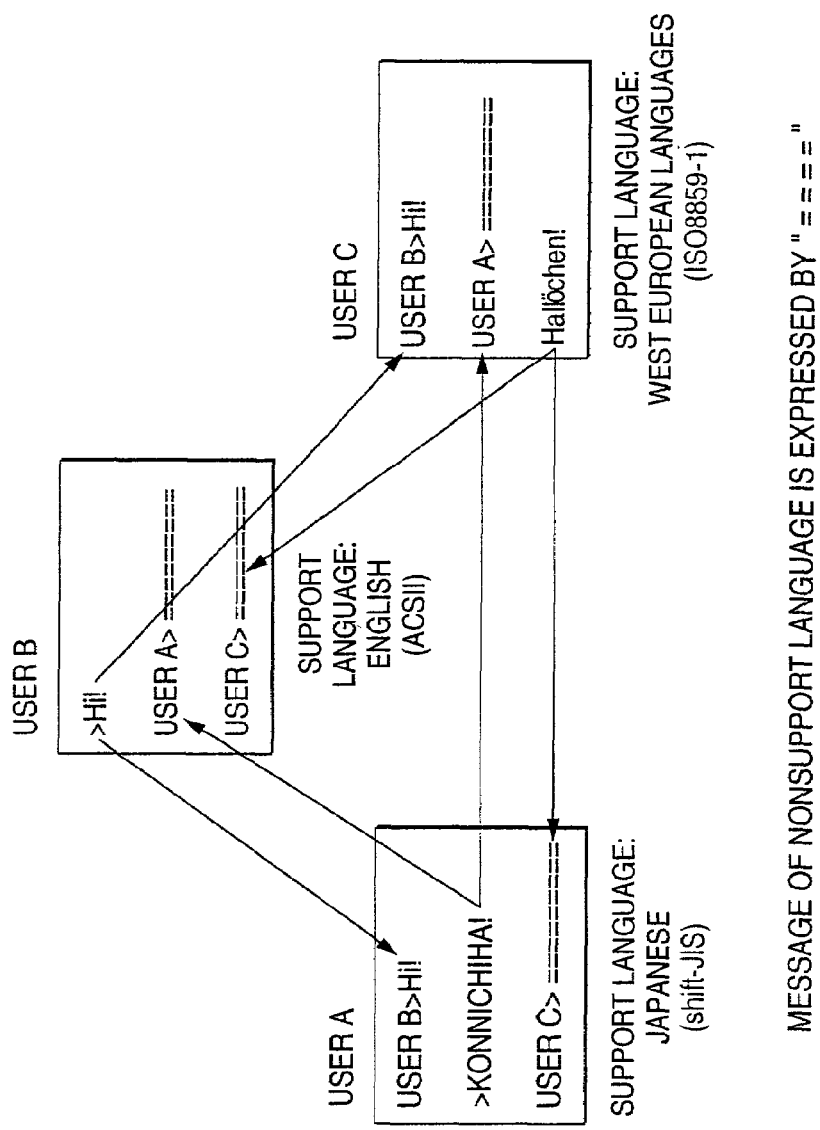
FIG. 1 is a conceptual view showing the concept of the present invention.

In an example shown in FIG. 1, first, when the user B inputs a message of English characters of [Hi!], this message is converted into a character code string according to ASCII, and a transmission frame, in which use language identification information indicating ASCII is automatically imparted to a head portion of the character code string or the like, is transmitted.

The users A and C receive the transmission frame, and recognize the use of ASCII from the use language identification information imparted to the header portion of the transmission frame. The ASCII character code is correctly supported in both shift-JIS and ISO8859-1, and a duplicate character code does not exist in the mutual character code systems, so that it is judged that this message is based on the supported character code system. Thus, in each of the users A and C, the message of the English characters, [Hi!], corresponding to the character code string is correctly displayed.

When the user A inputs a message of Japanese characters of [Konnichiha], this message is converted into a character code string according to shift-JIS, and a transmission frame, in which use language identification information indicating shift-JIS is automatically imparted to a head portion of the character code string or the like, is transmitted.

The users B and C receive the transmission frame, and recognize the use of shift-JIS from the use language identification information imparted to the header portion of the transmission frame. The shift-JIS character code is not supported in either ASCII or ISO8859-1, so that it is judged that this message is based on a nonsupported language. Thus, [====[ is displayed to the users B and C. It is previously arranged that the symbol expression of ]====] indicates reception of a message based on a nonsupported language.

When the user C inputs a message of German characters of [Hallochen!], this message is converted into a character code string according to ISO8859-1. Subsequently, a transmission frame, in which use language identification information indicating ISO8859-1 is automatically imparted to a head portion of the character code string or the like, is transmitted.

The users A and B receive the transmission frame, and recognize the use of ISO8859-1 from the use language identification information imparted to the header portion of the transmission frame. The ISO8859-1 character code is not supported in either shift-JIS or ASCII, and it is judged that this is based on a nonsupported language. Consequently, [===] is displayed to the users A and B.

Figure 2:
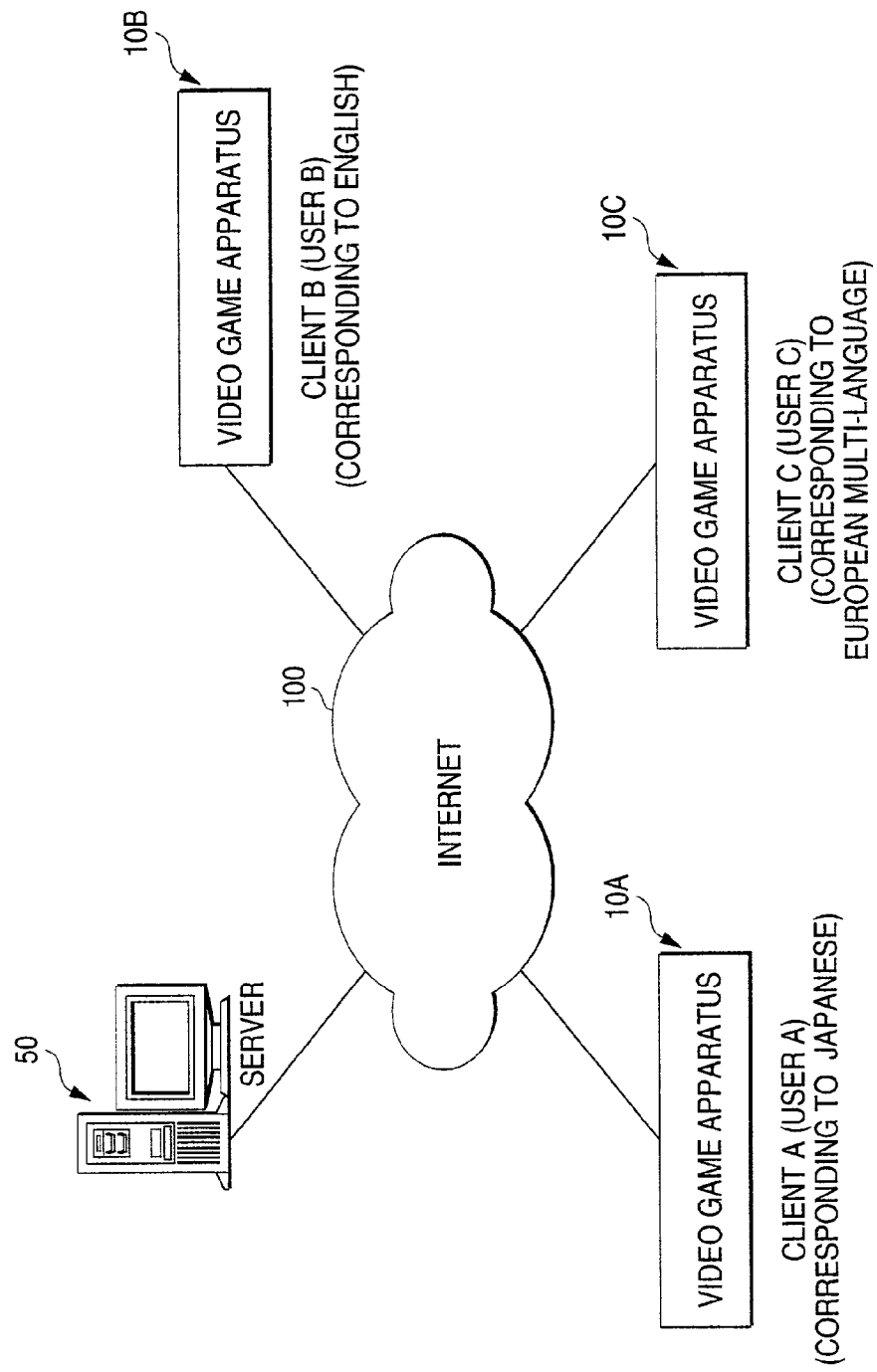
FIG. 2 is a system structural view showing a system structure of the invention, according to an aspect of the present invention.

FIG. 2 shows a system structure. The clients (users) A, B and C operate video game apparatuses 10A, 10B and 10C, respectively. All of the video game apparatuses 10A, 10B and 10C are connected to a server 50 of an internet service provider through an internet 100 so that two-way communications can be made. Here, the server 50 functions as a relay of mutual two-way communications of the video game apparatuses 10A, 10B and 10C.

Figure 3:
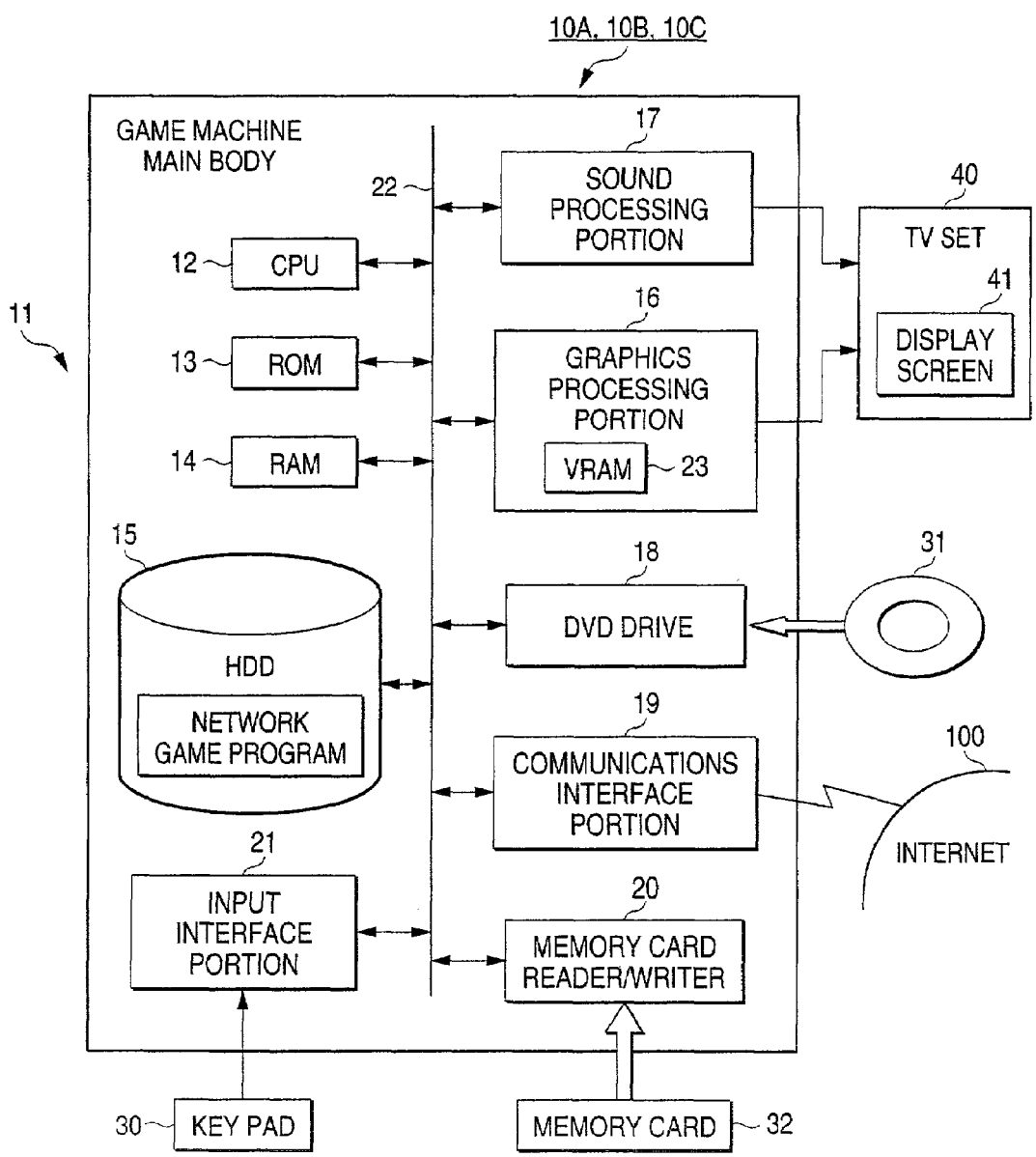
FIG. 3 is a block diagram showing an embodiment of a video game apparatus according to an aspect of the invention.

FIG. 3 shows the video game apparatus 10A, 10B or 10C as an information processing apparatus according to the present invention.

This video game apparatus executes a program recorded in a computer-readable recording medium according to the present invention, and is also used for execution of a message transmission and reception method according to the present invention.

The video game apparatus 10A, 10B or 10C is constituted by a game machine main body 11 having a built-in computer, and a keypad 30 connected to an input side of the game machine main body 11. A TV set 40 including a CRT or the like, as a monitor with a speaker, is connected to an output side of the game machine main body 11. The keypad 30 is operated by the user (player), and gives operation instructions by the user to the game machine main body 11.

The keypad 30 can input a message composed of characters to the game machine main body 11 by character selection of a character pallet displayed on a screen of the TV set 40, or the like. Incidentally, instead of the keypad 30, it is also possible to connect a keyboard, which can input characters, to the input side of the game machine main body 11, and a message composed of characters can also be input.

On the basis of a video signal (picture signal) and a sound signal from the game machine main body 11, the TV set 40 makes a screen display of a picture (image) according to game contents, and a message of transmission or reception, and makes a sound output.

The game machine main body 11 includes a CPU 12, a ROM 13, a RAM 14, a hard disk drive 15, a graphics processing portion 16, a sound processing portion 17, a DVD drive 18, a communications interface portion 19, a memory card reader/writer 20, an input interface portion 21, and a bus 22 mutually connecting each of the elements.

The CPU 12 executes an operating system stored in the ROM 13 for basic control of the whole apparatus, and executes a program of a network game or the like for a client (for a general user) stored in a program storage region of the RAM 14.

The RAM 14 stores the program of the network game for the general user, image data, or the like read out from a disk 31, such as a DVD or CD-ROM, in respective regions. The game program and the image data can also be stored in the hard disk drive 15.

The graphics processing portion 16 includes a VRAM 23 and a frame buffer as a buffer memory for storing image data. The graphics processing portion 16 generates a video signal on the basis of the image data stored in the frame buffer by instructions from the CPU 12 resulting from the execution of a program, and outputs the video signal to the TV set 40. By this, a screen display with the image data stored in the frame buffer is obtained on a display screen 41 of the TV set 40.

The sound processing portion 17 includes a function of generating a sound signal such as background music (BGM) or effective sound. The sound processing portion 17 generates the sound signal on the basis of the data stored in the RAM 14 by instructions from the CPU 12 resulting from the execution of the program, and outputs it to the TV set 40.

The DVD or CD-ROM 31 as a recording medium is detachably set in the DVD drive 18, and the drive reads out the network game program for the general user, image data, sound data, and the like stored in the DVD or CD-ROM 31.

The communications interface portion 19 is connected to the internet 100 and performs data communications with other apparatuses.

A memory card 32 is detachably set in the memory card reader/writer 20, and save data, such as midway data in the progress of a game or game environment setting data, are stored.

The computer-readable recording medium according to an aspect of the invention is a computer-readable recording medium recorded with a program of a network game in which conversation can be made in the Internet, and is constituted by the DVD or CD-ROM 31 or the hard disk 15.

The computer-readable recording medium is a computer-readable recording medium recorded with a program for transmitting a message through a network and receiving a character code string corresponding to a message through the network, and records the program which causes a computer, here, the game machine main body 11, to execute transmission processing and reception processing set forth below.

(Transmission Procession)

A character code string corresponding to an input message is generated in accordance with a character code system of a use language set in the video game apparatus 10A, 10B or 10C by the input of the message composed of characters. Also, use language identification information indicating the type of the use language of the character code string is imparted to a transmission frame of the character code string. Subsequently, the transmission frame is transmitted.

(Reception Processing)

A language of a character code string in a transmission frame is judged from use language identification information imparted to the transmission frame when the transmission frame to which the use language information is imparted is received. Then, it is judged whether or not a character code system corresponding to the language of the received character code string is a character code system supported by the game apparatus. When the character code system is supported, a message corresponding to the received character code string is generated in accordance with the character code system, and the generated message is displayed. When the character code system is not supported, notice information indicating that a message can not be generated is displayed.

In each of the video game apparatuses 10A, 10B and 10C, data concerning a character input and a display are set in accordance with the use language. FIGS. 4A, 4B and 4C show data structures in the respective video game apparatuses 10A, 10B and 10C. In the video game apparatus 10A, its use language is Japanese, its support code system is shift-JIS, and a shift-JIS code table and a Japanese font are installed. In the video game apparatus 10B, its use language is English, its support code system is ASCII, and an ASCII code table and an English font are installed. In the video game apparatus 10C, its use language is German, its support code system is ISO8859-1 (Latin-1), and an ISO8859-1 code table and a West European language font are installed.

Incidentally, with respect to the support code system, multiple languages can be set in the respective video game apparatuses 10A, 10B and 10C, and in order to support a new character code system, it is necessary to provide an encoder of a character code and to install data of a character font. The encoder includes a code table, and the code table is defined in the encoder.

Figures 5A, 5B:
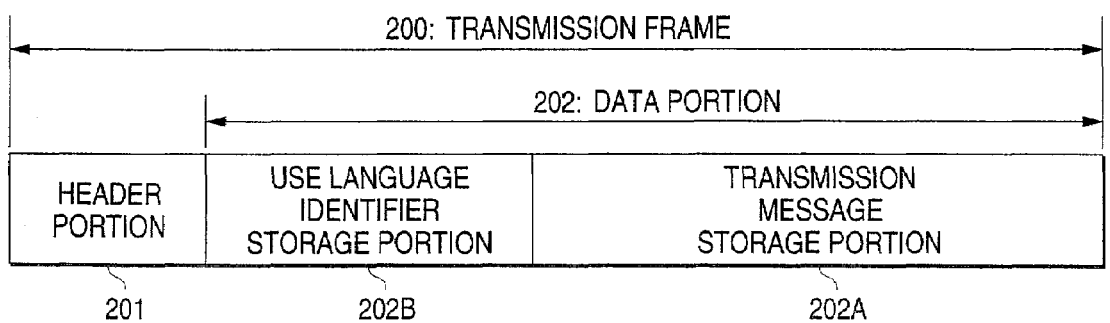
FIG. 5A is an explanatory view showing an example of a use language identifier-character code system corresponding table defined in a video game apparatus according to an aspect of the present invention.
FIG. 5B is an explanatory view showing an example of a format of a transmission frame for message transmission, used in the video game apparatus according to an aspect of the present invention.

The video game apparatuses 10A, 10B and 10C include a use language identifier (use language identification information)—character code system corresponding table as common data. As shown in FIG. 5A, the use language identifier (use language identification information)—character code system corresponding table is a corresponding table of an abbreviation (identifier) for identifying a use language, such as JAP or ENG, and a character code system. In FIG. 5A, when the identifier for use language identification imparted to the transmission frame is [JAP], the character code system is [shift-JIS], and the support language becomes Japanese (English+Japanese). Similarly, when the identifier is [ENG], the character code system is ⇔ASCII], and the support language becomes English. When the identifier is [Latin 1], the character code system is [ISO8859-1], and the support language becomes a West European language (English+German, etc.). When the identifier is [CHA], the character code system becomes [GB2312-80], and the support language becomes Chinese (English+Chinese). When the identifier is [KOR], the character code system is [KSX1002: 1991], and the support language is Korean (English+Korean). Each of the respective video game apparatuses 10A, 10B and 10C can identify the kind of the character code system of the use language of its own machine from the use language identifier (use language identification information)—character code system corresponding table. Incidentally, FIG. 5A shows the contents of the support language for reference data.

FIG. 5B shows a frame format example of a frame (transmission frame) for character code string transmission. The whole of the transmission frame is designated by 200, and includes a header portion 201 determined by a communications protocol and a data portion 202. A transmission original address, a transmission destination address and the like are written in the header portion 201. The data portion 202 includes a transmission message storage portion 202A in which a character code string corresponding to a message to be transmitted is written, and a use language identifier storage portion 202B defined at a portion positioned at the head portion of the transmission message storage portion 202A. An identifier indicating a use language, such as [JAP], is automatically written in the use language identifier storage portion 202B.

Figure 6:
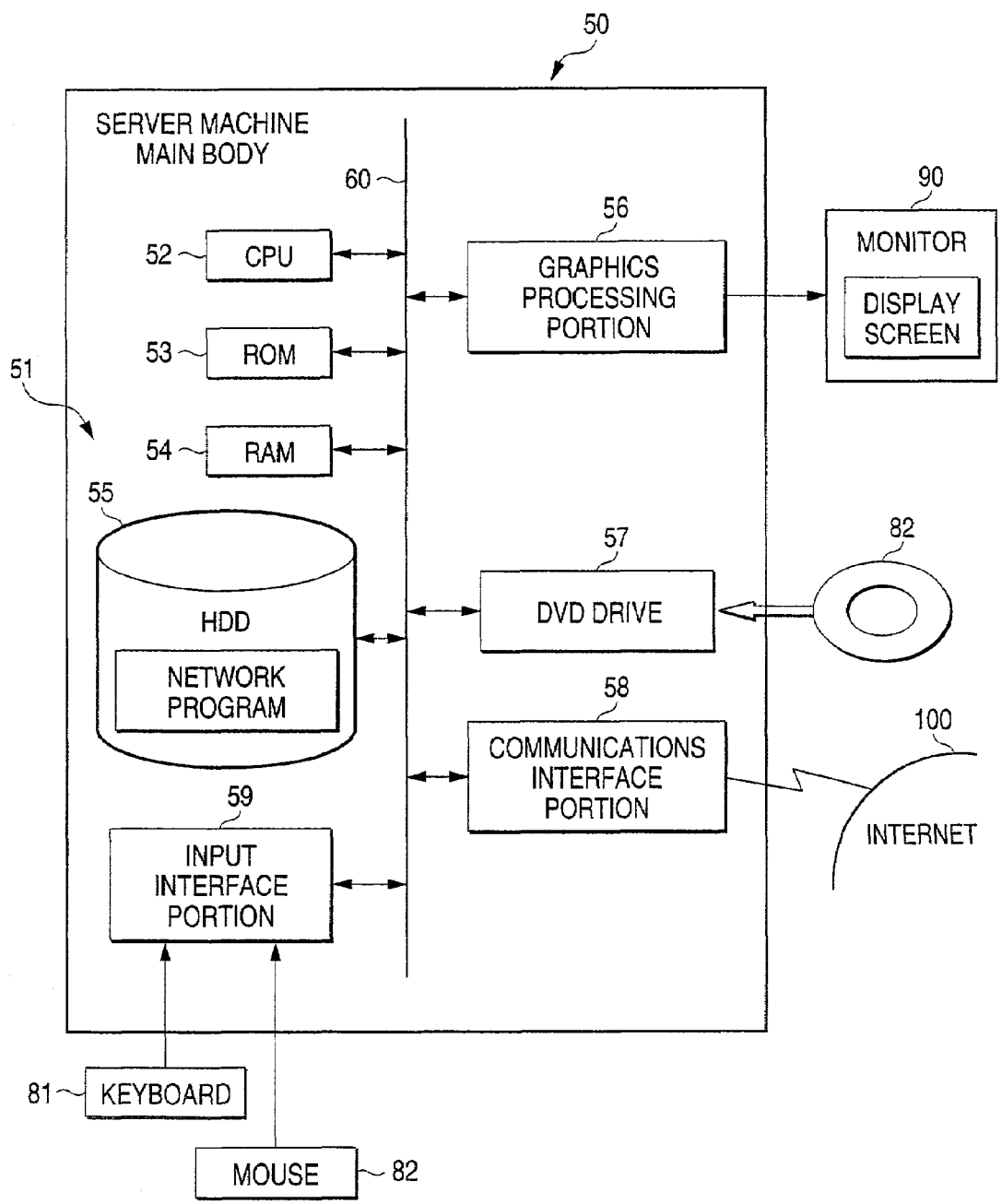
FIG. 6 is a block diagram of a server, according to an aspect of the present invention.

Next, the structure of the server 50 will be described with reference to FIG. 6.

The server 50 includes a server main body (computer main body) 51, a keyboard 81 connected to an input side of the server main body 51, and a mouse 82. A monitor 90 is connected to an output side of the server main body 51. The monitor 90 makes a screen display on the basis of a video signal (picture signal) from the server main body 51.

The server main body 51 includes a CPU 52, a ROM 53, a RAM 54, a hard disk drive 55, a graphics processing portion 56, a DVD drive 57, a communications interface portion 58, an input interface portion 59, and a bus 60 for mutually connecting the elements.

The CPU 52 executes an operating system stored in the ROM 53, and makes basic control of the whole apparatus, and executes a program of a network game or the like for a server stored in a program storage region of the RAM 54.

The RAM 54 stores the program of the network game or the like for the server read out from a disk 82 such as a DVD or CD-ROM by the DVD drive 57. The game program or the like can also be stored in the hard disk drive 55.

The DVD or CD-ROM 82 as the recording medium is detachably set to the DVD drive 57, and the drive reads out the network game program for the server stored in the DVD or CD-ROM 82.

The communications interface portion 58 is connected to an Internet 100, and becomes a relay station of communications of the video game apparatuses 10A, 10B and 10C as client machines.

Figure 7:
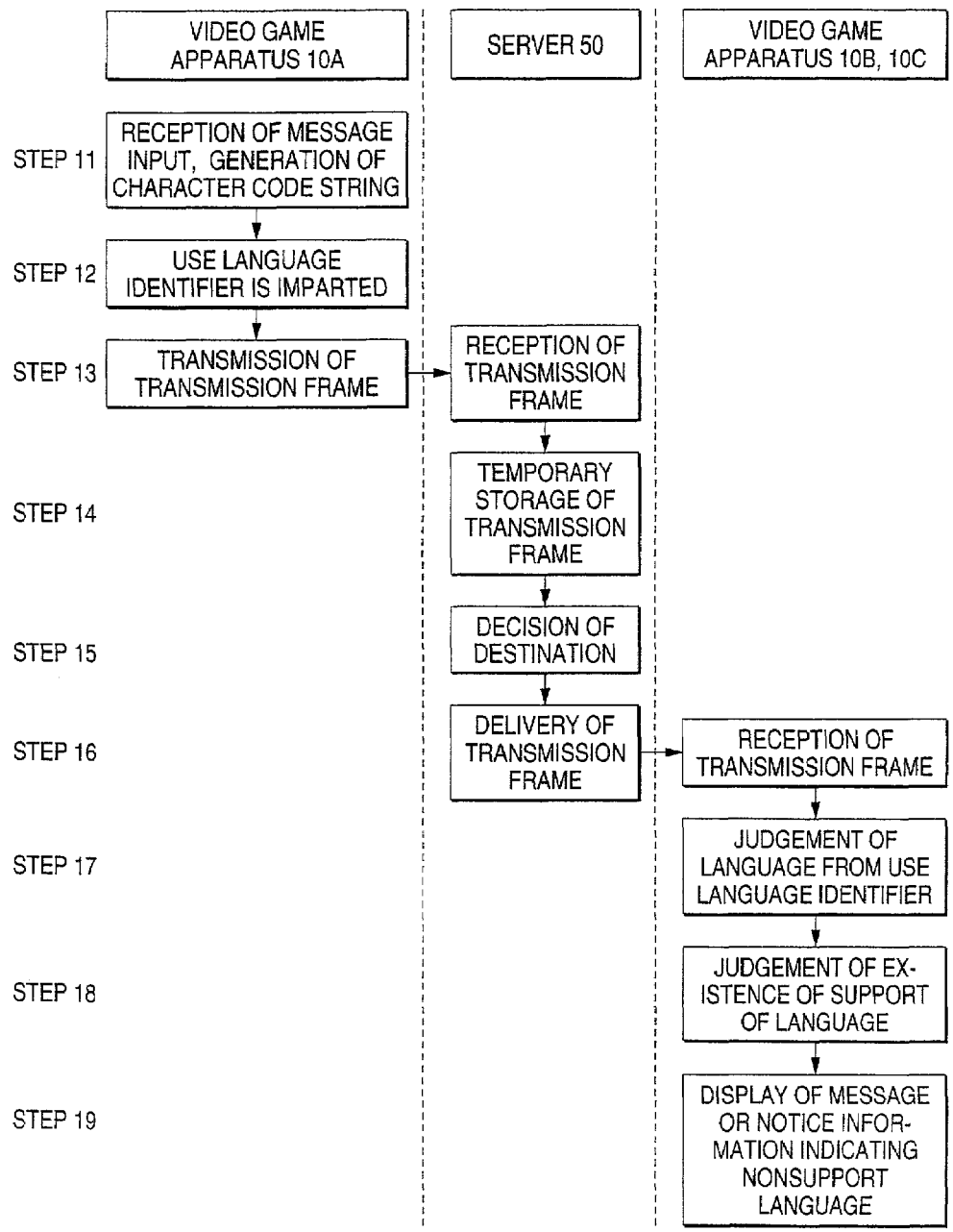
FIG. 7 is a flowchart showing a communication procedure of message exchange according to an aspect of the invention.

With reference to FIG. 7, a communications procedure of transmission and reception of a message among the video game apparatuses will be described, as an example, where the video game apparatus 10A transmits a message.

First, at step 11, the video game apparatus 10A receives a message input, and generates a character code string corresponding to the input message in accordance with the character code system of the language set used in the video game apparatus 10A.

Next, at step 12, in the video game apparatus 10A, the use language of the message, in other words, an identifier of the language set used in the video game apparatus 10A is imparted to the use language identifier storage portion 202B of the transmission frame 200 of the message (character code string).

Next, at step 13, the transmission frame 200 is transmitted from the video game apparatus 10A. The server 50 receives this transmission frame 200.

Next, at step 14, the sever 50 temporarily stores the transmission frame 200 from the video game apparatus 10A.

Next, at step 15, the server 50 determines a delivery destination of the stored transmission frame 200 in accordance with the progress of the game or the like. Here, it is assumed that the delivery destination is both the video game apparatuses 10B and 10C.

Next, at step 16, the server 50 delivers the transmission frame 200. Both the video game apparatuses 10B and 10C receive this transmission frame 200.

Next, at step 17, each of the video game apparatuses 10B and 10C checks the identifier of the use language imparted to the use language identifier storage portion 202B of the transmission frame 200, and judges the language of the received message.

Next, at step 18, each of the video game apparatuses 10B and 10C judges whether the language of the received message is supported.

Next, at step 19, in accordance with the judgment result as to whether the language of the received message is supported, each of the video game apparatuses 10B and 10C makes a screen display of the received message or a screen display of notice information indicating a nonsupported language.

Figure 8:
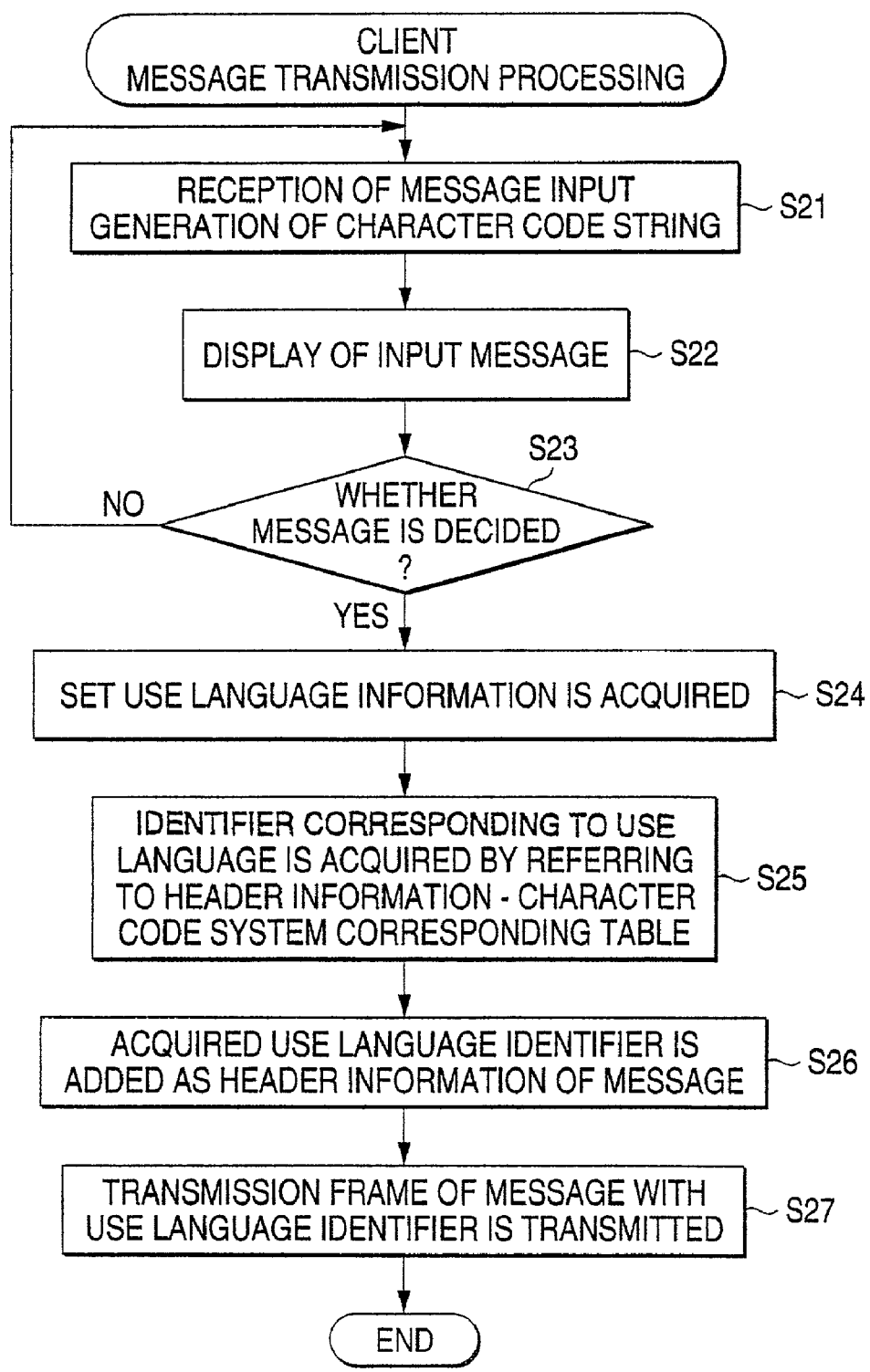
FIG. 8 is a flowchart showing a client message transmission processing according to an aspect of the invention.

A message transmission processing from the video game apparatus 10A, 10B or 10C (client machine) will be described with reference to a flowchart shown in FIG. 8.

First, a message input is received, a character code string corresponding to the input message is generated in accordance with a character code system of a language set used in the video game apparatus (step S21), and the character string of the input message is displayed on a screen (step S22).

Until the input of the message is entered (NO at step S23), the message input reception, the character code string generation, and the screen display of the message character string repeat. When the input of the message is entered (YES at step S23), information of the language set used in its own machine is acquired (step S24), and an identifier corresponding to the use language is acquired by referring to a use language identifier—character code system corresponding table as shown in FIG. 5 (step S25).

Next, the acquired identifier of the use language is added as the identifier information of the input message to the use language identifier storage portion 202B of the transmission frame 200 (step S26), and the transmission frame 200 of the message with the use language identifier is transmitted (step S27). By this, the routine at the message transmission side is completed.

Figure 9:
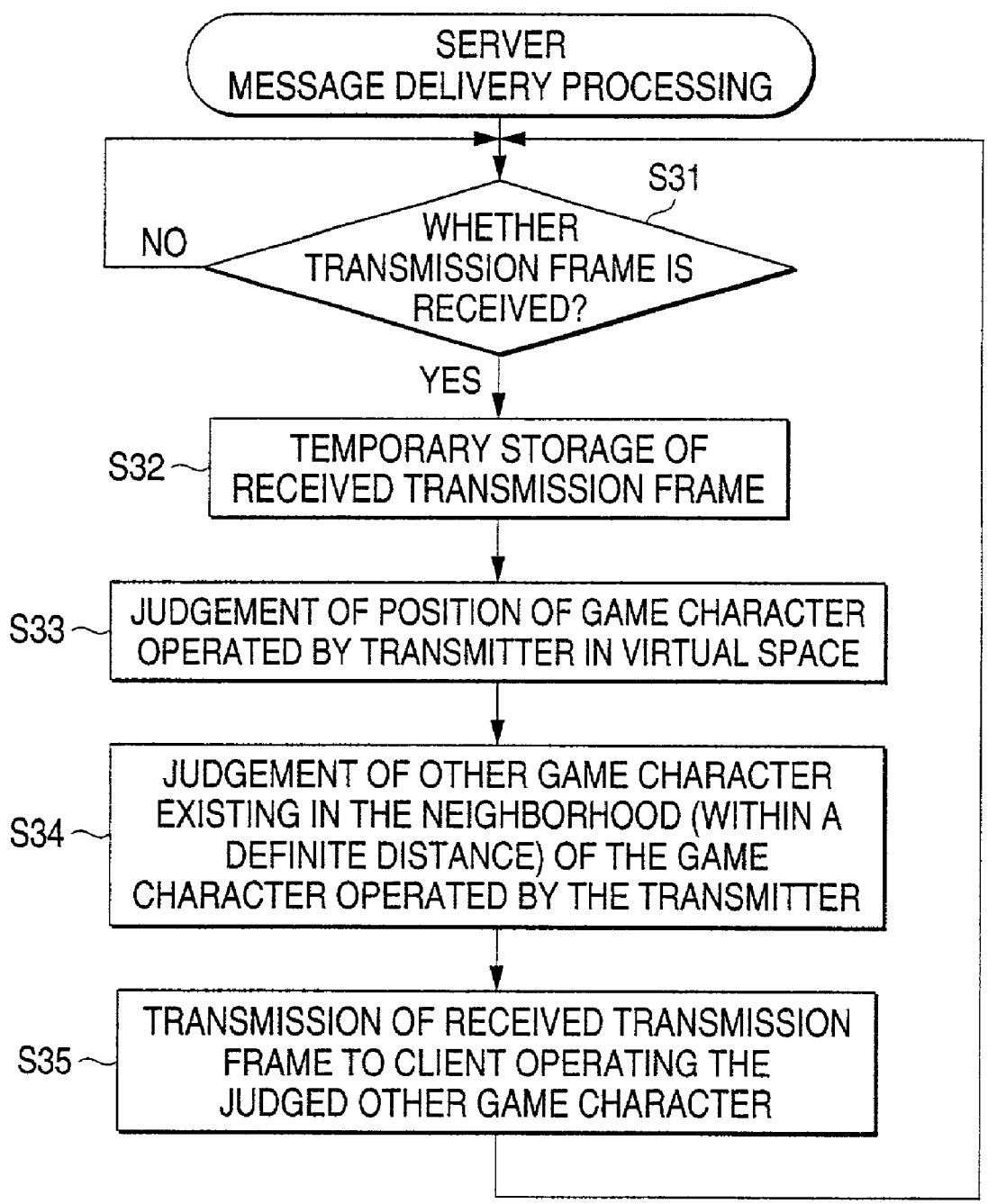
FIG. 9 is a flowchart showing a message delivery processing of a server according to an aspect of the invention.

A message delivery processing of the server 50 will be described with reference to a flowchart shown in FIG. 9.

Reception of a transmission frame is monitored (step S31), and when the transmission frame is received, the transmission frame is temporarily stored (step S32).

Next, a position of a character in a virtual space in a game (network game) operated by a transmitter is judged (step S33), and existence of another game character in the neighborhood (range of a certain distance) of the game character operated by the transmitter is judged (step S34). A client operating the judged other game character is specified, and the received transmission frame 200 is transmitted to the client (step S35). By this, the message delivery routine in the server 50 is completed.

Incidentally, the foregoing example is an example in which players exchange messages in the network game, and in the case where the invention is applied to a chat, message delivery is made to all members taking part in a chat room.

Figure 10:
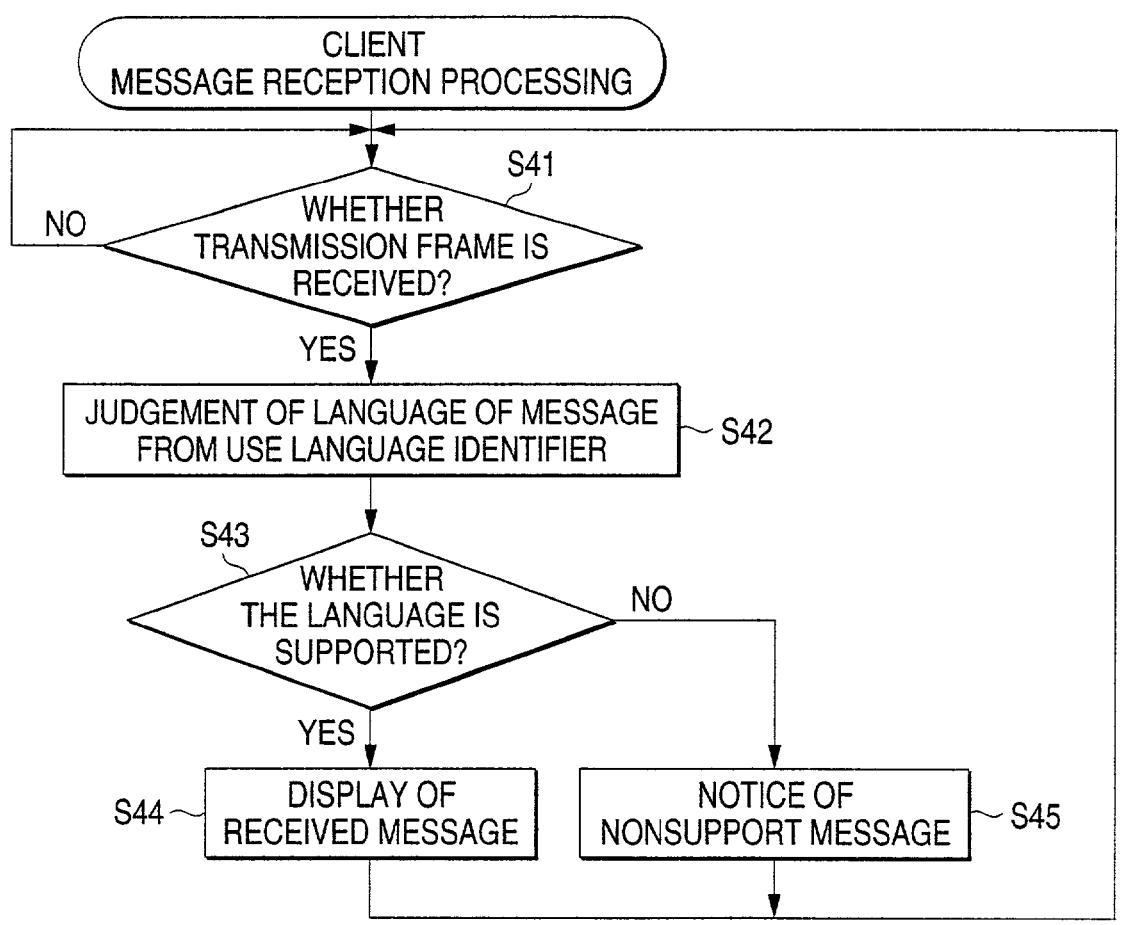
FIG. 10 is a flowchart showing a client message reception processing according to an aspect of the invention.
Figure 11A:
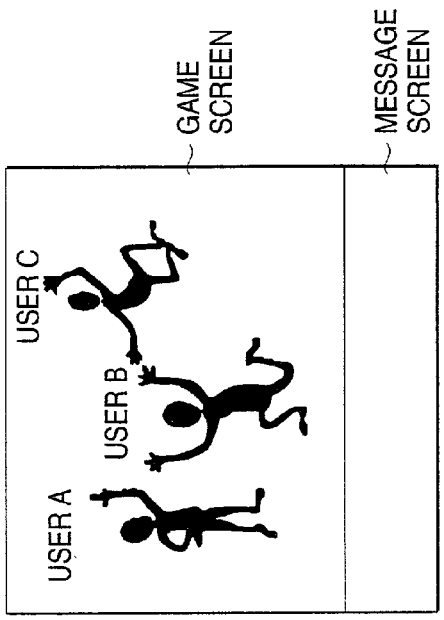
FIGS. 11A, 11B and 11C are explanatory views showing examples of screen transitions of respective client machines (video game apparatuses) at the time of message exchange according to an aspect of the invention.
Figure 11B:
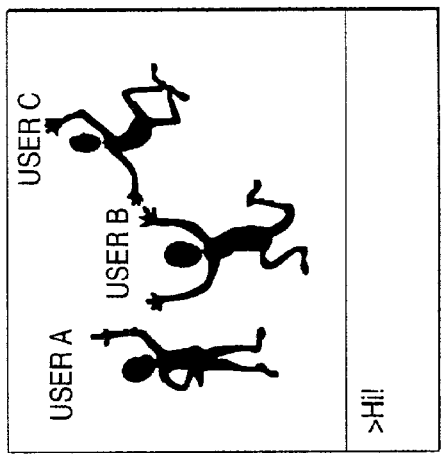
Figure 11C:
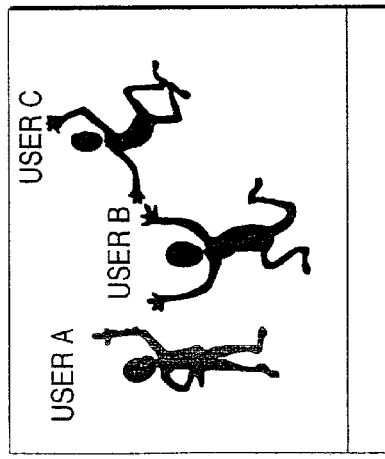
Figure 12A:
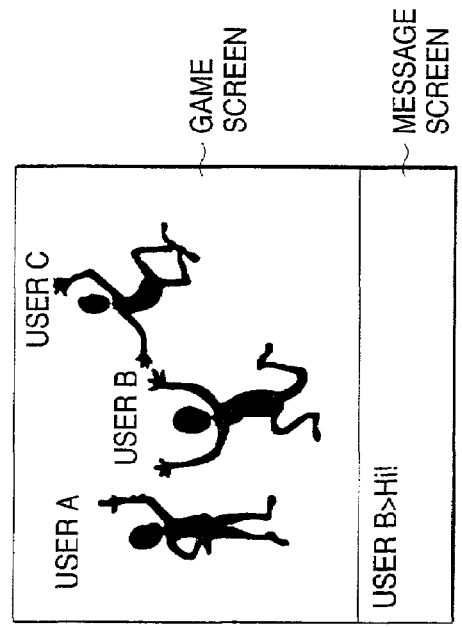
FIGS. 12A, 12B and 12C are explanatory views showing examples of screen transitions of respective client machines (video game apparatuses) at the time of message exchange according to an aspect of the invention.
Figure 12B:
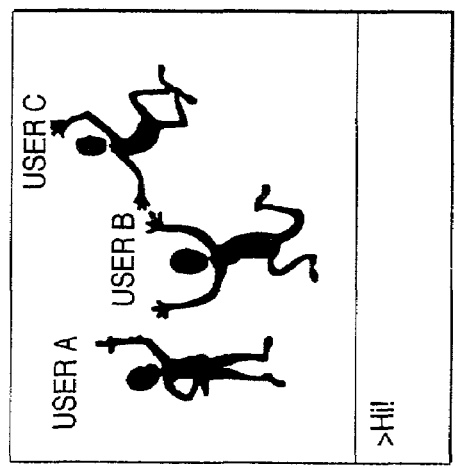
Figure 12C:
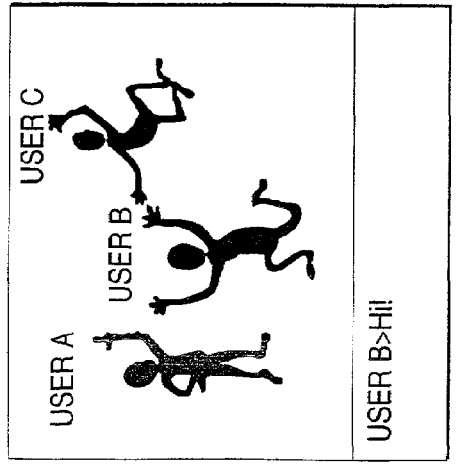
Figure 13A:
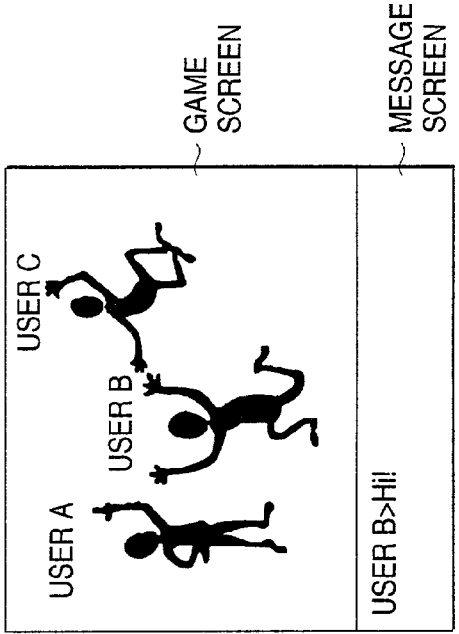
FIGS. 13A, 13B and 13C are explanatory views showing examples of screen transitions of respective client machines (video game apparatuses) at the time of message exchange according to an aspect of the invention.
Figure 13B:
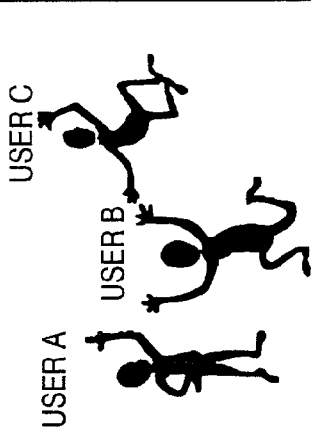
Figure 13C:
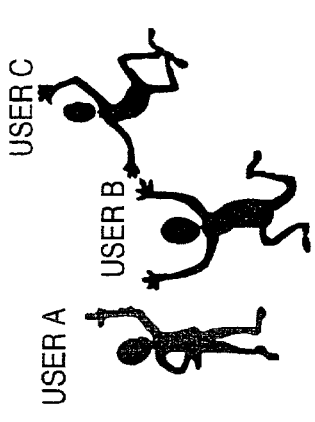
Figure 15A:
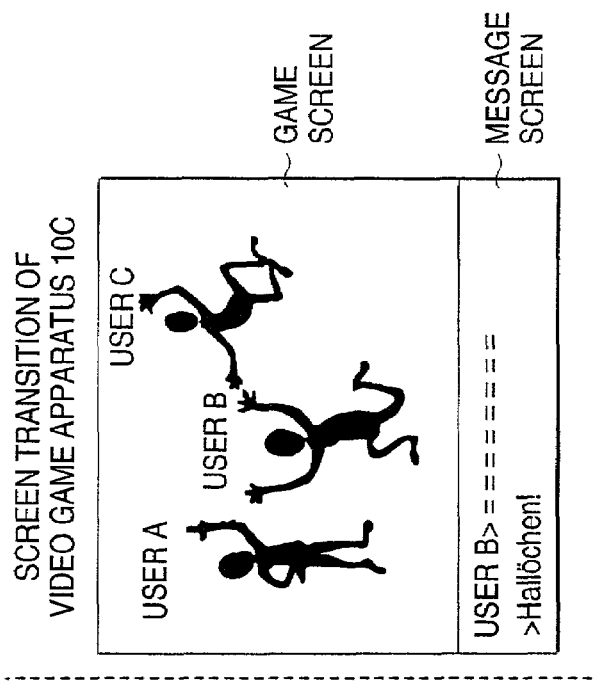
FIGS. 15A, 15B and 15C are explanatory views showing examples of the screen transitions of the client machines (video game apparatuses) at the time of message exchange according to an aspect of the invention.
Figure 15B:
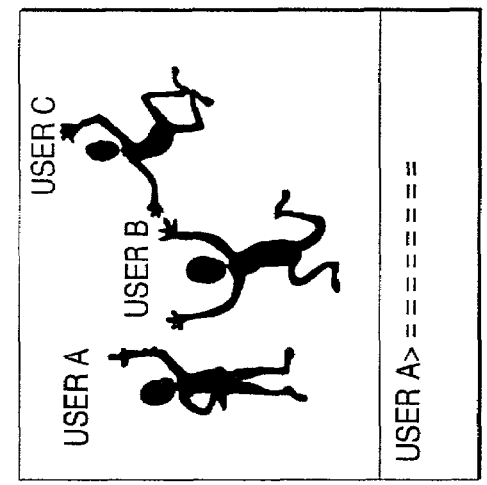
Figure 15C:
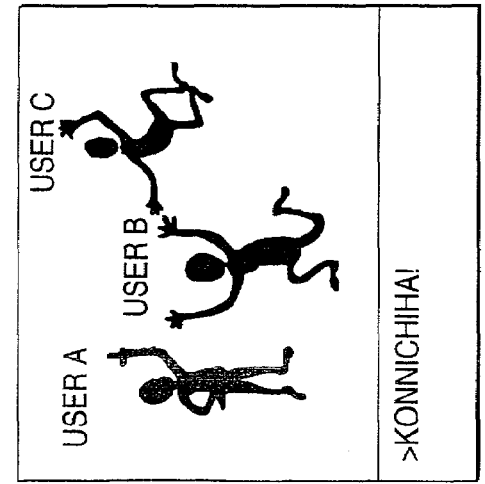

A message reception processing of the video game apparatus 10A, 10B or 10C (client machine) will be described with reference to a flowchart shown in FIG. 10.

Reception of the transmission frame 200 is monitored (step S41), and a use language identifier imparted to the use language identifier storage portion 202B of the received transmission frame 200 is read out. Consequently, a language of a received message is judged (step S42).

Next, it is judged whether the language of the received message is a supported language (a character code system corresponding to the language of the received character code string is supported) (step S43).

In the case of the supported language, a message corresponding to the received character code string is generated in accordance with the corresponding character code system, and the generated message is displayed (step S44).

On the other hand, in the case where the character code system corresponding to the language of the received character code string is not supported, notice information (notice of a nonsupport message) indicating that a message can not be generated is displayed (step S45).

FIGS. 11A, 11B, 11C, 12A, 12B, 12C, 13A, 13B, 13C, 14A, 14B, 14C, 15A, 15B, 15C, 16A, 16B and 16C show screen transitions of the video game apparatuses 10A, 10B and 10C in the case where the respective users of the video game apparatuses 10A, 10B and 10C transmit messages of [Hi!], [Konnichiha], and [Hallochen!], in the order of the user B, the user A, and the user C.

In this example, when a message in a nonsupported language is received, a symbol of [=====] is displayed. Incidentally, a message line (transmission message line) input to the user's own machine is expressed by [>], and a message line (reception message line) of another user is expressed by [user A, B, C >].

By this, the illegal character is not produced at the time of reception of a message in a nonsupported language, and when [=====] is displayed on the reception message line of the screen, the user can accurately know the reception of the message in the nonsupported language. Thus, the sense of uneasiness of the user can be alleviated.

In addition, since the use language is accurately judged from the affixed use language identifier of the received message, in the case where multiple kinds of support languages are set, the character code system of the use language is automatically changed in the range of the support languages on the basis of the judgment result of the use language through the use language identifier. Consequently, and the received message can be displayed.

Accordingly, to another embodiment, FIGS. 17A, 18B and 17C show data structures defined in the video game apparatuses 10A, 10B and 10C in the case where a notice is provided by characters (message) when a message in a nonsupported language is received. The main difference between the data structures shown in FIGS. 17A, 17B and 17C and the data structures shown in FIGS. 4A, 4B and 4C is that a notice sentence of a nonsupported language is set for each use language.

In order to produce a sense of a game, the notice sentence in this example is 「<<<nazo no kotoba ga kikoeru>>>」in the case of Japanese, 「<<<An unknown language is heard>>>」 in the case of English, and 「<<<Ein unbekannete Sprache ist zu horen>>>」in the case of German.

FIGS. 18A, 18B and 18C show screen examples of the video game apparatuses 10A, 10B and 10C in this case. In this case as well, the illegal character is not produced at the time of reception of a message with a nonsupported language, and when the nonsupported language notice sentence such as 「<<<nazo no kotoba ga kikoeru>>>」is displayed at the reception message line of the screen, the user can accurately know the reception of the message with the nonsupported language. Thus, the sense of uneasiness of the user can be alleviated.

As another embodiment, FIGS. 19A, 19B and 19C show data structures defined in the video game apparatuses 10A, 10B and 10C in the case where a notice in the case of reception of a message in a nonsupported language is made by an icon expression of a national flag of a country where a language of a message transmitter is a mother language. With respect to the data structures, the different point from those shown in FIGS. 4A, 4B and 4C is that data for a display of an identification icon (national flag, etc.) of a use language is included.

The data for the display of the language identification icon included in each of the video game apparatuses 10A, 10B and 10C is a national flag (bit map data) of a country where each language is a mother language as shown in FIG. 20.

FIGS. 21A, 21B and 21C shows screen examples of the video game apparatuses 10A, 10B and 10C in this case. In this case as well, the illegal character is not produced at the time of reception of a message with a nonsupported language. When the national flag is displayed at the reception message line of the screen, the user can accurately know the reception of a message in a nonsupported language, and the sense of uneasiness of the user can be alleviated. Further, the a type of use language of the message with the nonsupported language can be known from the national flag. Accordingly, if necessary, additional installation of the support language can be accurately made.

FIGS. 22A, 22B and 22C show a case where nothing is displayed to provide notice that a message in a nonsupported language is received. In this case, since the video game apparatus 10B does not support a received message, a display is not made.

As is understood from the above explanation, according to the computer readable recording medium of the present invention, the message transmission program, the message reception program, the message transmission-reception program, the message transmission method, the message reception method, the message transmission-reception method, and the information processing apparatus, a nonsense illegal character display of a received message can be completely avoided, and in the case where the received message can not be correctly displayed, the sense of uneasiness of the user can be alleviated by intelligibly informing the user that the language of the message is not supported.

What is claimed is:

1. A computer-readable recording medium recorded with a program for transmitting a message through a network, the program causing a computer to generate a character code string corresponding to the message input in accordance with a character code system of a language set used in the computer when the message composed of characters is input, to impart use language identification information, indicating a type of use language of the character code string, to a transmission frame of the character code string, to judge, within a virtual space, a position of a video game character operated by a transmitter, to judge, within the virtual space, whether a position of another video game character is within a predetermined distance of the transmitter video game character, and when the characters are within the predetermined distance, to transmit to the other video game character the transmission frame with the use language identification information, which is not converted when received.

2. A computer-readable recording medium recorded with a program for transmitting a message through a network and receiving a character code string, corresponding to the message, through the network, the program causing a computer to generate the character code string, corresponding to the message input in accordance with a character code system of a language set used in the computer, when the message composed of characters is input, to impart use language identification information, indicating a type of use language of the character code string, to a transmission frame of the character code string, to judge, within a virtual space, a position of a video game character operated by a transmitter, to judge, within the virtual space, whether a position of another video game character is within a predetermined distance of the transmitter video game character, when the characters are within the predetermined distance, to transmit to the other video game character the transmission frame, to judge the use language of the character code string in a transmission frame from use language identification information imparted to the transmission frame when the transmission frame is received, without converting the use language identification information, to judge whether the character code system, corresponding to the language of the received character code string, is supported by the computer, to generate an output message corresponding to the received character code string in accordance with the character code system when the character code system is supported, and to display the generated output message.

3. A computer-readable recording medium recorded with a program for transmitting a message through a network and receiving a character code string, corresponding to the message, through the network, the program causing a computer to generate the character code string, corresponding to the message input in accordance with a character code system of a language set used in the computer, when the message composed of characters is input, to impart use language identification information indicating a type of use language of the character code string to a transmission frame of the character code string, to judge, within a virtual space, a position of a video game character operated by a transmitter, to judge, within the virtual space, whether a position of another video game character is within a predetermined distance of the transmitter video game character, when the characters are within the predetermined distance, to transmit to the other video game character the transmission frame, to judge the use language of the character code string in the transmission frame from use language identification information imparted to the transmission frame when the transmission frame is received, without converting the use language identification information, to judge whether the character code system, corresponding to the language of the received character code string, is supported by the computer, to generate an output message corresponding to the received character code string in accordance with the character code system when the character code system is supported, to display the generated output message, and to display notice information indicating that the message can not be generated when the character code system is not supported.

4. The computer-readable recording medium according to claim 3, wherein the notice information comprises a symbol.

5. The computer-readable recording medium according to claim 3, wherein the notice information comprises a notice message indicating reception of the character code string in which a message can not be generated.

6. The computer-readable recording medium according to claim 3, wherein the program includes data of icons respectively corresponding to different languages, and the notice information comprises an icon corresponding to the language indicated by the use language identification information.

7. The computer-readable recording medium according to claim 6, wherein the icon comprises a national flag of a country in which the corresponding language is a mother language.

8. A computer-readable recording medium recorded with a program for transmitting a message through a network and receiving a character code string, corresponding to the message, through the network, the program causing a computer to generate the character code string corresponding to the message input in accordance with a character code system of a language set used in the computer when the message composed of characters is input, to impart use language identification information indicating a type of use language of the character code string to a transmission frame of the character code string, to judge, within a virtual space, a position of a video game character operated by a transmitter, to judge, within the virtual space, whether a position of another video game character is within a predetermined distance of the transmitter video game character, when the characters are within the predetermined distance, to transmit the transmission frame to the other video game character, to judge the use language of the character code string in the transmission frame from use language identification information imparted to the transmission frame when the transmission frame is received, without converting the use language identification information, to judge whether the character code system, corresponding to the language of the received character code string, is supported by the computer, to generate an output message corresponding to the received character code string in accordance with the character code system when the character code system is supported, to display the generated output message, and to stop a message display when the character code system is not supported.

9. A message transmission method for transmitting a message through a network from a computer, the method comprising:

generating a character code string corresponding to the message input in accordance with a character code system of a language set used in the computer when the message composed of characters is input;

imparting use language identification information indicating a type of use language of the character code string to a transmission frame of the character code string;

judging, within a virtual space, a position of a video game character operated by a transmitter, judging, within the virtual space, whether a position of another video game character is within a predetermined distance of the transmitter video game character, and when the characters are within the predetermined distance, transmitting to the other video game character the transmission frame with the use language identification information, which is not converted when received.

10. A message transmission-reception method for transmitting a message through a network from a computer and receiving a character code string corresponding to the message through the network into the computer, the method comprising:

generating the character code string corresponding to the message input in accordance with a character code system of a language set used in the computer when the message composed of characters is input;

imparting use language identification information, indicating a type of use language of the character code string, to a transmission frame of the character code string;

judging, within a virtual space, a position of a video game character operated by a transmitter, judging, within the virtual space, whether a position of another video game character is within a predetermined distance of the transmitter video game characters, when the characters are within the predetermined distance, transmitting the transmission frame to the other video game character;

judging the use language of the character code string in the transmission frame from use language identification information imparted to the transmission frame when the transmission frame is received, without converting the use language identification information;

judging whether a character code system, corresponding to the use language of the received character code string, is supported by the computer;

generating an output message corresponding to the received character code string in accordance with the character code system when the character code system is supported; and displaying the generated output message.

11. A message transmission-reception method for transmitting a message through a network from a computer and receiving a character code string corresponding to the message through the network into the computer, the method comprising:

generating the character code string corresponding to the message input in accordance with a character code system of a language set used in the computer when the message composed of characters is input;

imparting use language identification information indicating a type of use language of the character code string to a transmission frame of the character code string;

judging, within a virtual space, a position of a video game character operated by a transmitter, judging, within the virtual space, whether a position of another video game character is within a predetermined distance of the transmitter video game character, when the characters are within the predetermined distance, transmitting the transmission frame to the other video game character;

judging the use language of the character code string in the transmission frame from use language identification information imparted to the transmission frame when the transmission frame is received, without converting the use language identification information;

judging whether the character code system, corresponding to the language of the received character code string, is supported by the computer;

generating an output message corresponding to the received character code string in accordance with the character code system when the character code system is supported;

displaying the generated message; and displaying notice information indicating that the message can not be generated when the character code system is not supported.

12. A message transmission-reception method for transmitting a message through a network from a computer and receiving a character code string, corresponding to the message, through the network into the computer, the method comprising:

generating the character code string corresponding to the message input in accordance with a character code system of a language set used in the computer when the message composed of characters is input;

imparting use language identification information indicating a type of use language of the character code string to a transmission frame of the character code string;

judging, within a virtual space, a position of a video game character operated by a transmitter, judging, within the virtual space, whether a position of another video game character is within a predetermined distance of the transmitter video game when the characters are within the predetermined distance, transmitting the transmission frame to the other video game character;

judging the use language of the character code string in the transmission frame from use language identification information imparted to the transmission frame when the transmission frame is received, without converting the use language identification information;

judging whether the character code system, corresponding to the language of the received character code string, is supported by the computer;

generating an output message corresponding to the received character code string in accordance with the character code system when the character code system is supported;

displaying the generated output message; and stopping a message display when the character code system corresponding to the language of the received character code string is not supported.

13. An information processing apparatus for transmitting a message through a network, wherein the apparatus generates a character code string corresponding to the message input in accordance with a character code system of a language set used in the information processing apparatus when the message composed of characters is input, imparts use language identification information, indicating a type of use language of the character code string, to a transmission frame of the character code string, judges, within a virtual space, a position of a video game character operated by a transmitter, judges, within the virtual space, whether a position of another video game character is within a predetermined distance of the transmitter video game character, and when the characters are within the predetermined distance, transmits to the other video game character the transmission frame with the use language identification information, which is not converted when received.

14. An information processing apparatus for transmitting a message through a network and receiving a character code string, corresponding to the message, through the network, wherein the apparatus generates the character code string corresponding to the message input in accordance with a character code system of a language set used in the information processing apparatus when the message composed of characters is input, imparts use language identification information, indicating a type of use language of the character code string, to a transmission frame of the character code string, judges, within a virtual space, a position of a video game character operated by a transmitter, judges, within the virtual space, whether a position of another video game character is within a predetermined distance of the transmitter video game character, when the characters are within the predetermined distance, transmits the transmission frame to the other video game character, judges the language of the character code string in the transmission frame from use language identification information imparted to the transmission frame when the transmission frame is received, without converting the use language identification information, judges whether the character code system, corresponding to the language of the received character code string, is supported by the information processing apparatus, generates an output message corresponding to the received character code string in accordance with the character code system when the character code system is supported, and displays the generated output message.

15. An information processing apparatus for transmitting a message through a network and receiving a character code string, corresponding to the message, through the network, wherein the apparatus generates the character code string corresponding to the message input in accordance with a character code system of a language set used in the information processing apparatus when the message composed of characters is input, imparts use language identification information, indicating a type of use language of the character code string, to a transmission frame of the character code string, judges, within a virtual space, a position of a video game character operated by a transmitter, judges, within the virtual space, whether a position of another video game character is within a predetermined distance of the transmitter video game character, when the characters are within the predetermined distance, transmits the transmission frame to the other video came character, judges the use language of the character code string in the transmission frame from use language identification information imparted to the transmission frame when the transmission frame is received, without converting the use language identification information, judges whether a character code system, corresponding to the language of the received character code string, is supported by the information processing apparatus, generates an output message corresponding to the received character code string in accordance with the character code system when the character code system is supported, displays the generated output message, and displays notice information indicating that the message can not be generated when the character code system is not supported.

16. An information processing apparatus for transmitting a message through a network and receiving a character code string corresponding to the message through the network, wherein the apparatus generates the character code string corresponding to the message input in accordance with a character code system of a language set used in the information processing apparatus when the message composed of characters is input, imparts use language identification information, indicating a type of use language of the character code string, to a transmission frame of the character code string, judges, within a virtual space, a position of a video game character operated by a transmitter, judges, within the virtual space, whether a position of another video game character is within a predetermined distance of the transmitter video game character, when the characters are within the predetermined distance, transmits the transmission frame to the other video game character, judges the use language of the character code string in the transmission frame from use language identification information imparted to the transmission frame when the transmission frame is received, without converting the use language identification information, judges whether the character code system, corresponding to the language of the received character code string, is a character code system supported by the information processing apparatus, generates an output message corresponding to the received character code string in accordance with the character code system when the character code system is supported, displays the generated message, and stops a message display when the character code system is not supported.

\* \* \* \* \*

UNITED STATES PATENT AND TRADEMARK OFFICE
CERTIFICATE OF CORRECTION

PATENT NO.        : 7,120,573 B2                                      Page 1 of 1
APPLICATION NO.   : 09/794916
DATED             : October 10, 2006
INVENTOR(S)       : Richard Mark Honeywood It is certified that error appears in the above-identified patent and that said Letters Patent is hereby corrected as shown below:

Title Page Item (73), Assignee, "Kabushiki Kaisha Square Enix" should be --Kabushiki Kaisha Square Enix (also trading as Square Enix Co. Ltd.)--.

Signed and Sealed this

First Day of April, 2008

JON W. DUDAS
*Director of the United States Patent and Trademark Office*